United States Patent [19]
Lokhandwala et al.

[11] Patent Number: 5,401,300
[45] Date of Patent: Mar. 28, 1995

[54] SOUR GAS TREATMENT PROCESS INCLUDING DEHYDRATION OF THE GAS STREAM

[75] Inventors: Kaaeid A. Lokhandwala, Menlo Park; Richard W. Baker, Palo Alto; Lora G. Toy, San Francisco; Karl D. Amo, San Carlos, all of Calif.

[73] Assignee: Membrane Technology and Research, Inc., Menlo Park, Calif.

[21] Appl. No.: 143,283

[22] Filed: Oct. 25, 1993

[51] Int. Cl.$^6$ .................. B01D 53/22; B01D 71/52
[52] U.S. Cl. ............................. 95/49; 95/51; 95/52
[58] Field of Search .................. 95/45, 49, 51, 52

[56] References Cited

U.S. PATENT DOCUMENTS

| | | | |
|---|---|---|---|
| 3,534,528 | 10/1970 | Porter | 55/16 |
| 4,130,403 | 12/1978 | Cooley et al. | 55/16 |
| 4,370,150 | 1/1983 | Fenstermaker | 55/16 |
| 4,374,657 | 2/1983 | Schendel et al. | 62/19 |
| 4,493,716 | 1/1985 | Swick | 55/158 |
| 4,497,640 | 2/1985 | Fournie et al. | 55/16 |
| 4,518,399 | 5/1985 | Croskell et al. | 95/51 |
| 4,561,864 | 12/1985 | Klass et al. | 55/16 |
| 4,589,896 | 5/1986 | Chen et al. | 62/28 |
| 4,597,777 | 7/1986 | Graham | 55/16 |
| 4,606,740 | 8/1986 | Kulprathipanja | 55/16 |
| 4,608,060 | 8/1986 | Kulprathipanja | 55/16 |
| 4,659,343 | 4/1987 | Kelly | 55/16 |
| 4,737,166 | 4/1988 | Matson | 55/16 |
| 4,781,733 | 1/1988 | Babcock et al. | 55/16 |
| 4,783,201 | 11/1988 | Rice et al. | 55/16 |
| 4,857,078 | 8/1989 | Walter | 55/16 |
| 4,875,908 | 10/1989 | Kikukawa et al. | 95/52 |
| 4,963,165 | 10/1990 | Blume et al. | 55/16 |
| 5,002,590 | 3/1991 | Friesen et al. | 55/16 |
| 5,067,970 | 11/1991 | Wang et al. | 95/51 |

FOREIGN PATENT DOCUMENTS

| | | | |
|---|---|---|---|
| 0495540 | 11/1976 | Australia | 95/49 |
| 0430304 | 6/1991 | European Pat. Off. | 95/52 |
| 1-043329 | 2/1989 | Japan | 95/51 |
| 1-070125 | 3/1989 | Japan | 95/51 |
| 1478083 | 6/1977 | United Kingdom . | |

OTHER PUBLICATIONS

W. J. Schell et al., "Separation of Co2 from Mixtures by Membrane Permeation", Gas Cond. Conf, Univ. of Oklahoma, Mar. 1983.

W. J. Schell et al., "Spiral-Wound Permeators for Purification and Recovery", Chem. Eng. Progress, Oct. 1982, pp. 33–37.

N. N. Li et al., "Membrane Separation Process in the Petrochemical Industry", Phase II Report Dept of Energy, Sep. 1987, pp. 1–12, 17–22.

T. E. Sulpizio et al. "Gas Dehydration by Memb-Industrial feasibility" report to Gas Research Institute, Jun. 1993.

E. W. Funk et al. "Effect of Impurities on Cellulose Acetate Membrane Performance" Recent Adv Separation Tech, AIChE Symps. 250, vol. 82, 1986.

A. B. Coady et al. "Co2 Recovery by Gas Permeation", Chem Eng. Progress Oct. 1982, pp. 44–49.

F. G. Russell, "Applications of the DELSEP Membrane System", Chem Engineering Progress, Oct. 1984, pp. 48–52.

(List continued on next page.)

Primary Examiner—Robert Spitzer
Attorney, Agent, or Firm—J. Farrant

[57] ABSTRACT

Improved membranes and improved membrane processes for treating gas streams containing hydrogen sulfide and methane, plus water vapor, carbon dioxide or both. The processes rely on the availability of two membrane types, one of which has a high hydrogen sulfide/methane selectivity and a high water vapor/methane selectivity, when measured with multicomponent gas mixtures at high pressures. Based on the different permeation properties of the two membrane types, optimized separation processes can be designed. In favorable cases, the processes can simultaneously dehydrate the gas stream and remove the hydrogen sulfide to very low levels.

30 Claims, 11 Drawing Sheets

OTHER PUBLICATIONS

D. Parro, "Membrane CO2 Separation", Energy Progress, vol. 5, No. 1, Mar. 1985, pp. 51–54.

G. Cutler et al., "Large Scale CO2 Recovery with Membranes", Gas Cond. Conference, 1985.

T. E. Cooley et al., "Field Tests Show Membrane Processing Attractive" Chem. Engineering Progress, Oct. 1985, pp. 45–50.

G. Markiewicz, "Separex Membrane Systems: The Economical Solution to Gas Treating Problems", Gas Processor's Assoc Mtg, Jan. 1988.

D. J. Stookey et al., "Natural Gas Processing with PRISM Separators", Environmental Progress, vol. 3, No. 3, Aug. 1984, pp. 212–214.

W. H. Mazur et al., "Membranes for Natural Gas Sweetening CO2 Enrichment", Chem Eng. Progress, Oct. 1982, pp. 38–43.

M. D. Donahue et al., "Permeation behavior of carbon dioxide–methane Mixtures in cellulose acetate membranes", Journal Membrane Science No. 42, 1989 pp. 197–214.

A. Deschamps et al., "Development of Gaseous Permeation Membranes adapted to the Purification of Hydrocarbons", IIF–IIR Comm A3, Paris, 1989.

D. L. Ellig et al., "Concentration of methane from Mixtures with Carbon Dioxide by Permeation through Polymeric Films", Journal of Membrane Science, 6, 1980 pp. 259–263.

B. D. Bhide et al., "Membrane processes for the removal of acid gases from natural gas. Process configurations and optimization of operating conditions." Journal Memb. Science, 81, 1993 pp. 209–237.

B. D. Bhide et al., "Membrane processes for the removal of acid gases from natural gas. Effects of operating conditions, economic parameters and membrane properties" Journal Memb Sc., 81, 1993, pp. 239–252.

SOUR GAS TREATMENT PROCESS INCLUDING DEHYDRATION OF THE GAS STREAM

FIELD OF THE INVENTION

The invention relates to processes for removing acid gases from gas streams. More particularly, the invention relates to a membrane process for removing hydrogen sulfide, plus water vapor, carbon dioxide or both, from gas streams, such as natural gas.

BACKGROUND OF THE INVENTION

Natural gas provides more than one-fifth of all the primary energy used in the United States. Much raw gas is "subquality", that is, it exceeds the pipeline specifications in nitrogen, carbon dioxide and/or hydrogen sulfide content. A representative range of U.S. gas compositions, compared to the specifications that must be met to bring the gas to pipeline quality, is shown in Table 1.

TABLE 1

Natural Gas Compositions Found in the U.S. and the Specifications of the Pipeline Grid

| Component | Typical pipeline spec. | Typical composition range |
|---|---|---|
| Hydrogen sulfide | <4 ppm | ** 76% <4 ppm<br>11% 4–1,000 ppm<br>4% 1,000–10,000 ppm<br>8% >10,000 ppm |
| Carbon dioxide | <1–3% | ** 72% <1%<br>18% 1–3%<br>7% 3–10%<br>3% >10% |
| Water | 80–140 ppm | 800–1,200 ppm |
| Inerts ($CO_2$, $N_2$, He, Ar, etc.) | <3–4% | — |
| Oxygen | <0.4% | — |

** Compositions for producing wells. Unexploited reserves contain higher fractions of subquality gas.

The best treatment for natural gas right now is no treatment. Currently, more than half of the gas produced in the U.S. can be brought to pipeline specification after minimal processing, such as glycol dehydration to remove water. Raw gas that is known to be high in nitrogen content, high in nitrogen plus carbon dioxide content, or high in hydrogen sulfide content is usually left in the ground, because it cannot be extracted and treated economically with present processing technology.

There are several aspects to the problem of treating natural gas to bring it to pipeline specifications. The first is the removal of impurities, primarily water, hydrogen sulfide and carbon dioxide; the second is loss of methane during processing. Processes that remove hydrogen sulfide and carbon dioxide may also remove a portion of the methane. Losses of less than about 3% are normally acceptable; losses of 3–10% may be acceptable if offset by other advantages; losses above 10% are normally unacceptable. A third aspect is the fate of the impurities once removed. Carbon dioxide can be discharged or reinjected, but hydrogen sulfide, which is toxic even in low concentrations, must be treated. If the waste stream containing hydrogen sulfide can be concentrated sufficiently, it may be passed to a Claus plant for conversion to sulfur. Waste streams containing low concentrations must be disposed of in some other way, such as a redox process of the LO CAT or Stretford type, for example, or, less desirably, flaring.

Choice of appropriate treatment is, therefore, not straightforward, and depends on the feed gas composition, the size and location of the plant and other variables.

When natural gas is treated, most plants handling large volumes of sour gas containing greater than about 200 ppm hydrogen sulfide use amine-based technology for acid gas removal. Amines commonly used include MEA, DEA, DIPA, DGA and MDEA. The plants can remove both carbon dioxide and hydrogen sulfide. When the amine solution is spent, the acid gases are flashed off and the solution is regenerated. The mechanical equipment in an amine plant makes it susceptible to failure. The plant includes heaters, aerial coolers, pumps, etc. and requires frequent quality checks and maintenance, making operational reliability probably the weakest feature of the technology.

Amine plants do not sorb methane to any significant extent, so methane loss is not an issue in this case. However, the hydrogen-sulfide-containing gas stream produced when the sorbent is regenerated must still be treated, subject to the same constraints as above.

As an alternative to amine sorption, or as a polishing step following any process, specialized scavenging or sulfur recovery processes, such as Sulfa-Scrub, Sulfa-Check, Chemsweet, Supertron 600, solid iron sponge or solid zinc oxide may be used for low-volume streams containing less than about 100 ppm hydrogen sulfide. Many scavengers present substantial disposal problems, however. In an increasing number of states, the spent scavenger constitutes toxic waste.

A considerable body of literature exists regarding membrane-based treatment of natural gas, mostly using cellulose acetate (CA) membranes to remove carbon dioxide. Membrane technology is attractive for this separation, because treatment can be accomplished using the high wellhead gas pressure as the driving force for the separation. Membrane systems, have, however, been slow to penetrate the market, and it is estimated that no more than about 1% of all processing is carried out using membranes. Nevertheless, for small-scale streams of appropriate composition, cellulose acetate membrane plants are state-of-the art, and up to 100 of these are believed to have been installed. Although all of these plants are designed to remove carbon dioxide, cellulose acetate membranes also have selectivity for hydrogen sulfide over methane, so they tend to coextract small amounts of hydrogen sulfide. Unless the raw gas stream contains very high concentrations of carbon dioxide, however, it is not possible to reduce a stream containing even modest amounts of hydrogen sulfide to pipeline specification (usually 4 ppm hydrogen sulfide) without vastly overprocessing as far as the carbon dioxide specification is concerned. If such overprocessing is performed, large amounts of methane are lost in the membrane permeate stream, and this is normally unacceptable.

Only a few of the many literature references relating to membrane-based carbon dioxide treatment specifically discuss removal of hydrogen sulfide in conjunction with the carbon dioxide. A paper by W. J. Schell et al. ("Separation of $CO_2$ from Mixtures by Membrane Permeation", presented at the Gas Conditioning Conference, University of Oklahoma, March 1983) says that "If the $H_2S$ level is low enough, the membrane system can also be used to meet pipeline specification for this component without any further treatment required." The paper shows a case where a cellulose acetate membrane system can be used to reach pipeline specification for carbon dioxide and hydrogen sulfide in two stages, starting with a feed content of 15% carbon dioxide and 250 ppm hydrogen sulfide, and points out that, for high concentrations of hydrogen sulfide, "a much larger number of elements are required to reduce the H$_2$S levels to pipeline specification (¼ grain) than for CO$_2$ (3%)." The costs of membrane treatment are estimated to be more than 100% higher than conventional amine treatment in this case.

A report by N. N. Li et al. to the Department of Energy ("Membrane Separation Processes in the Petrochemical Industry", Phase II Final Report, September 1987) examined the effect of impurities, including hydrogen sulfide, on the ability of cellulose acetate membranes to remove carbon dioxide from natural gas. The reporters found that the membrane performance was not affected significantly by hydrogen sulfide alone. However, dramatic loss of membrane permeability was observed if both hydrogen sulfide and water vapor were present in the feed. The authors concluded that "successful use of these CA-based membranes must avoid processing gas which simultaneously has high H$_2$O and H$_2$S concentrations".

Another problem associated with cellulose acetate membranes is water, which is always present in raw natural gas streams to some extent, as vapor, entrained liquid, or both. The gas separation properties of cellulose acetate membranes are destroyed by contact with liquid water, so it is normally necessary to provide pretreatment to knock out any liquid water and to reduce the relative humidity low enough that there is no risk of condensation of water within the membrane modules on the permeate side. For example, the above-cited paper by W. J. Schell et al. ("Separation of CO$_2$ from Mixtures by Membrane Permeation", presented at the Gas Conditioning Conference, University of Oklahoma, March 1983) points out that "Even though membrane systems simultaneously dehydrate while removing CO$_2$, care must be taken to avoid contacting the membrane with liquid water. Feed gas streams saturated with water are normally preheated to at least 10° above the water dew point at the feed inlet pressure and the pressure tubes and inlet piping are insulated to prevent condensation."

The above-cited report by N. N. Li et al. ("Membrane Separation Processes in the Petrochemical Industry, Phase II Final Report, September 1987) presents data showing the effect of water vapor on membrane flux for cellulose acetate membranes, and concludes that "for relative humidities of 30% and higher, the flux decline is large, rapid, and irreversible". E. W. Funk et al. ("Effect of Impurities on Cellulose Acetate Membrane Performance", Recent Advances in Separation Techniques-III, AIChE Symposium Series, 250, Vol 82, 1986) advocate that "Moisture levels up to 20% RH appear tolerable but higher levels can cause irreversible membrane compaction".

U.S. Pat. No. 4,130,403 to T. E. Cooley et al. (Removal of H$_2$S and/or CO$_2$ from a Light Hydrocarbon Stream by Use of Gas Permeable Membrane, 1978, Col. 12, lines 36–39) states that "It has been discovered that in order to function effectively, the feed gas to the cellulose ester membrane should be substantially water free". A second paper by W. J. Schell et al. ("Spiral-Wound Permeators for Purification and Recovery", Chemical Engineering Progress, October 1982, pages 33–37) confirms that "Liquid water is detrimental to the performance of the membrane, however, so that the feed gas is delivered to the membrane system at less than 90% relative humidity."

In other words, although cellulose acetate membranes will permeate water preferentially over methane, and hence have the capability to dehydrate the gas stream, care must be taken to keep the amounts of water vapor being processed low, and, according to some teachings, as low as 20–30% relative humidity.

In light of these limitations, considerable effort has been expended over the last few years in the search for membrane materials that would be better able to handle streams containing carbon dioxide plus secondary contaminants, notably hydrogen sulfide and water. Developers of membrane materials usually rely on the solution-diffusion model to predict vapor and gas permeation behavior. In this model, it is assumed that gas at the high-pressure side of the membrane dissolves in the membrane material and diffuses down a concentration gradient to the low-pressure side of the membrane, where the gas is desorbed. It is assumed that the gas phases on either side of the membrane are in thermodynamic equilibrium with their respective polymeric interfaces, and that the interfacial sorption and desorption processes are rapid compared to the rate of diffusion through the membrane. Thus, the rate-limiting step is diffusion. For simple gases, Fick's law leads to the equation:

$$J = \frac{Dk\Delta p}{l} \tag{1}$$

which can be further simplified to $$J = \frac{P\Delta p}{l} \tag{2}$$

where J is the membrane flux (cm$^3$(STP)/cm$^2$.s.cmHg), D is the diffusion coefficient of the gas in the membrane (cm$^2$/sec) and is a measure of the gas mobility, L is the membrane thickness, k is the Henry's law sorption coefficient linking the concentration of the gas in the membrane material to the pressure in the adjacent gas (cm$^3$(STP)/cm$^3$.cmHg), and $\Delta p$ is the pressure difference across the membrane (cmHg).

The gas permeability $$P = \frac{J \cdot l}{\Delta p} = Dk \tag{3}$$

is a property of the membrane material and is independent of membrane thickness. In this definition, permeability is a measure of the rate at which a particular gas moves through a membrane of standard thickness (1 cm) under a standard pressure difference (1 cmHg). The convenient permeability unit, $1 \times 10^{-10}$ cm$^3$(STP).cm/cm$^2$.s. cmHg, is often called a Barrer, after R. M. Barrer, a pioneer in membrane permeation studies.

A measure of the ability of a membrane to separate two gases, A and B, is the ratio of their permeabilities, $\alpha$, called the membrane selectivity, $$\alpha_{A/B} = \frac{P_{(A)}}{P_{(B)}} \tag{4}$$

Equation (4) can also be written as $$\alpha_{A/B} = \left[\frac{D_A}{D_B}\right]\left[\frac{k_A}{k_B}\right] \quad (5)$$

The ratio $D_A/D_B$ is the ratio of the diffusion coefficients of the two gases and can be viewed as the mobility selectivity, reflecting the different sizes of the two molecules. The ratio $k_A/k_B$ is the ratio of the Henry's law solubility coefficients of the two gases and can be viewed as the solubility selectivity, reflecting the relative condensabilities of the two gases.

In all polymer materials, the diffusion coefficient decreases with increasing molecular size, because large molecules interact with more segments of the polymer chain than small molecules. Hence, the mobility coefficient always favors the passage of small molecules over large ones. The sorption coefficient, on the other hand, is a measure of the energy required for the permeant to be sorbed by the polymer and increases with the condensability of the permeant. This dependence on condensability means that the sorption coefficient increases with molecular diameter, because large molecules are normally more condensable than smaller ones. The combined effect of these two factors determines the selectivity of the membrane.

The balance between mobility selectivity and sorption selectivity is different for glassy and rubbery polymers. In glassy polymers, the mobility term is usually dominant, permeability falls with increasing permeant size and small molecules permeate preferentially. In rubbery polymers, the sorption term is usually dominant, permeability increases with increasing permeant size and larger molecules permeate preferentially. Since both carbon dioxide (3.3 Å) and hydrogen sulfide (3.6 Å) have smaller kinetic diameters than methane (3.8 Å), and since both carbon dioxide and hydrogen sulfide are more condensable than methane, both glassy and rubbery membranes are selective for the acid gas components over methane. To date, however, most membrane development work in this area has focused on glassy materials, of which cellulose acetate is the most successful example.

In citing selectivity, it is important to be clear as to how the permeation data being used have been measured. It is common to measure the fluxes of different gases separately, then to calculate selectivity as the ratio of the pure gas permeabilities. This gives the "ideal" selectivity for that pair of gases. Pure gas measurements are more commonly reported than mixed gas experiments, because pure gas experiments are much easier to perform. Measuring the permeation data using gas mixtures, then calculating the selectivity as the ratio of the gas fluxes, gives the actual selectivity that can be achieved under real conditions. In gas mixtures that contain condensable components, it is frequently, although not always, the case that the mixed gas selectivity is lower, and at times considerably lower, than the ideal selectivity. The condensable component, which is readily sorbed into the polymer matrix, swells or, in the case of a glassy polymer, plasticizes the membrane, thereby reducing its discriminating capabilities.

A technique for predicting mixed gas performance under real conditions from pure gas measurements with any reliability has not yet been developed. In the case of gas mixtures such as carbon dioxide/methane with other components, the expectation is that the carbon dioxide at least will have a swelling or plasticizing effect, thereby changing the membrane permeation characteristics. This expectation is borne out by cellulose acetate membranes. For example, according to a paper by M. D. Donahue et al. ("Permeation behavior of carbon dioxide-methane mixtures in cellulose acetate membranes", Journal of Membrane Science, 42, 197-214 1989) when measured with pure gases, the carbon dioxide permeability of asymmetric cellulose acetate is $9.8 \times 10^{-5}$ cm$^3$/cm$^2$.s.kPa and the methane permeability is $2.0 \times 10^{-6}$ cm$^3$/cm$^2$.s.kPa, giving an ideal selectivity of about 50. Yet the actual selectivity obtained with mixed gases is typically in the range 10-20, a factor of 3-5 times lower than the ideal selectivity. For example, the report to DOE by Norman Li et al., discussed above, gives carbon dioxide/methane selectivities in the range 9-15 for one set of field trials (at 870-905 psi feed pressure) and 12 for another set (at 200 psig feed pressure) with a highly acid feed gas. The W. J. Schell et al. Chemical Engineering Progress paper, discussed above, gives carbon dioxide/methane selectivities of 21 (at 250-450 psig feed pressure) and 23 (at 800 psig feed pressure). Thus, even in mixed gas measurements, a wide spread of selectivities is obtained, the spread depending partly on operating conditions. In particular, the plasticizing or swelling effect of the carbon dioxide on the membrane tends to show pressure dependence, although it is sometimes hard to distinguish this from other effects, such as the contribution of secondary condensable components.

As a first step in developing a new membrane, it is normal to start by testing with pure gases under mild operating conditions. Membranes that appear to pass this test can then be developed and tested further, modified, optimized and scaled up, leading eventually to field tests, full-scale demonstration and ultimately, industrial acceptance. Candidate membranes can and do fall by the wayside at each step along this path, for diverse reasons.

The search for improved membranes for removing acid components from gas streams, although it has focused primarily on glassy membranes, encompasses several types of membranes and membrane materials. A paper by A. Deschamps et al. ("Development of Gaseous Permeation Membranes adapted to the Purification of Hydrocarbons", I.I.F-I.I.R—Commission A3, Paris, 1989) describes work with aromatic polyimides having an intrinsic material selectivity of 80 for carbon dioxide over methane and 200,000 for water vapor over methane. The paper defines the target selectivities that the researchers were aiming for as 50 for carbon dioxide/methane and 200 for water vapor/methane. The paper, which is principally directed to dehydration, does not give carbon dioxide/methane selectivities, except to say that they were "generally low", even though the experiments were carried out with pure gas samples. In other words, despite the high intrinsic selectivity of 80, the lower target value of 50 could not be reached.

British patent number 1,478,083, to Klass and Landahl, presents a large body of permeation data obtained with methane/carbon dioxide/hydrogen sulfide mixed gas streams and polyamide (nylon 6 and nylon 6/6), polyvinyl alcohol (PVA), polyacrylonitrile (PAN) and gelatin membranes. Some unexpectedly high selectivities are shown. For the nylon membranes, carbon dioxide/methane selectivities of up to 30, and hydrogen sulfide/methane selectivities up to 60, are reported. The best carbon dioxide/methane selectivity is 160, for PAN at a temperature of 30° C. and a feed pressure of 65 psia; the best hydrogen sulfide/methane selectivity is 200, for gelatin at the same conditions. In both cases, however, the permeability is extremely low: for carbon dioxide through PAN, less than $5 \times 10^{-4}$ Barrer and for hydrogen sulfide through gelatin, less than $3 \times 10^{-3}$ Barrer. These low permeabilities would make the transmembrane fluxes miserable for any practical purposes. It is also unknown whether the gelatin membrane, which was plasticized with glycerin, would be stable much above the modest pressures under which it was tested.

U.S. Pat. No. 4,561,864, also to Klass and Landahl, incorporates in its text some of the data reported in the British patent discussed above. The '864 patent also includes a table of calculations for cellulose acetate membranes, showing the relationship between "Figure of Merit", a quantity used to express the purity and methane recovery in the residue stream, as a function of "Flow Rate Factor", a quantity that appears to be somewhat akin to stage-cut. In performing the calculations, separation factors (where the separation factor is the sum of the carbon dioxide/methane selectivity and the hydrogen sulfide/methane selectivity) of 20 to 120 are assumed. The figures used in the calculations appear to range from the low end of the combined carbon dioxide and hydrogen sulfide selectivities from mixed gas data to the high end of the combined selectivities calculated from pure gas data.

A paper by D. L. Ellig et al. ("Concentration of Methane from Mixtures with Carbon Dioxide by permeation through Polymeric Films", Journal of Membrane Science, 6, 259-263, 1980) summarizes permeation tests carried out with 12 different commercially available films and membranes, using a mixed gas feed containing 60% carbon dioxide, 40% methane, but no hydrogen sulfide or water vapor. The tests were carried out at 2,068 kPa (about 300 psi) feed pressure. The results show selectivities of about 9-27 for cellulose acetate, up to 40 for polyethersulfone and 20-30 for polysulfone. One of the membranes tested was nylon, which, in contradiction to the results reported by Klass and Landahl, showed essentially no selectivity at all for carbon dioxide over methane.

The already much-discussed DOE Final Report by N. N. Li et al. contains a section in which separation of polar gases from non-polar gases by means of a mixed-matrix, facilitated transport membrane is discussed. The membrane consists of a silicone rubber matrix carrying polyethylene glycol, which is used to facilitate transport of polar gases, such as hydrogen sulfide, over non-polar gases, such as methane. In tests on natural gas streams, the membranes exhibited hydrogen sulfide/methane selectivity of 25-30 and carbon dioxide/methane selectivity of 7-8, which latter number was considered too low for practical carbon dioxide separation. The membrane was also shown to be physically unstable at feed pressure above about 170 psig, which, even if the carbon dioxide/methane selectivity were adequate, would render it unsuitable for handling raw natural gas streams. U.S. Pat. Nos. 4,608,060, to S. Kulprathipanja, and 4,606,740, to S. Kulprathipanja and S. S. Kulkarni, of Li's group at UOP, present additional data using the same type of glycol-laden membranes as discussed in the DOE report. In this case, however, pure gas tests were performed and ideal hydrogen sulfide/methane selectivities as high as 115-185 are quoted. It is interesting to note that these are 4-8 times higher than the later measured mixed gas numbers quoted in the DOE report. The same effect obtains for carbon dioxide, where the pure gas selectivities are in the range 21-32 and the mixed gas data give selectivities of 7-8.

Similar in concept is U.S. Pat. No. 4,737,166, to S. L. Matson et al., which discloses an immobilized liquid membrane typically containing n-methylpyrrolidone or another polar solvent in cellulose acetate or any other compatible polymer. The membranes and processes discussed in this patent are directed to selective hydrogen sulfide removal, in other words leaving both the methane and the carbon dioxide behind in the residue stream. As in the UOP patents, very high hydrogen sulfide/methane selectivities, in the range 90-350, are quoted. Only pure gas data are given, however, and the feed pressure is 100 psig. There is no discussion as to how the membranes might behave when exposed to multicomponent gas streams and/or high feed pressures. Based on the UOP teachings, the mixed gas, high-pressure results might be expected to be not so good.

U.S. Pat. No. 4,781,733, to C. Babcock et al., describes results obtained with an interfacial composite membrane made by a polycondensation reaction between a diacidchloride-terminated silicone rubber and a diamine. In pure gas experiments at 100 psig, the membrane exhibited hydrogen sulfide/methane selectivities up to 47 and carbon dioxide/methane selectivities up to 50. No mixed gas or high-pressure data are given.

U.S. Pat. No. 4,493,716, to R. H. Swick, reports permeation results obtained with a composite membrane consisting of a polysulfide polymer on a Gorerex (polytetrafluoroethylene) support. Only pure gas, low-pressure test cell permeability data are given. Based on the reported permeabilities, which only give an upper limit for the methane permeability, the membrane appears to have a hydrogen sulfide/methane selectivity of at least 19-42 and a carbon dioxide/methane selectivity of at least 2-6. Some results show that the carbon dioxide permeability increased after exposure to hydrogen sulfide, which might suggest an overall decrease in selectivity if the membrane has become generally more permeable, although no methane data that could confirm or refute this are cited.

U.S. Pat. No. 4,963,165, to I. Blume and I. Pinnau reports pure gas, low-pressure data for a composite membrane consisting of a polyamide-polyether block copolymer on a polyamide support. Hydrogen sulfide/methane selectivities in the range 140-190, and carbon dioxide/methane selectivities in the range 18-20, are quoted. Mixed gas data for a stream containing oxygen, nitrogen, carbon dioxide and sulfur dioxide are also quoted and discussed in the text, but it is not clear how these data would compare with those for methane- or hydrogen-sulfide-containing mixed gas streams.

Despite the many and varied research and development efforts that this body of literature represents, cellulose acetate membranes, with their attendant advantages and disadvantages, remain the only membrane type whose properties in handling acid gas streams under real gas-field operating conditions are reasonably well understood, and the only membrane type in commercial use for removing acid gas components from methane.

U.S. Pat. No. 4,589,896, to M. Chen et al., exemplifies the type of process that must be adopted to remove carbon dioxide and hydrogen sulfide from methane and other hydrocarbons when working within the performance limitations of cellulose acetate membranes. The process is directed at natural gas streams with a high acid gas content, or at streams from enhanced oil recovery (EOR) operations, and consists of a multistage membrane separation, followed by fractionation of the acid gas components and multistage flashing to recover the hydrogen sulfide. The acid-gas-depleted residue stream is also subjected to further treatment to recover hydrocarbons. The raw gas to be treated typically contains as much as 80% or more carbon dioxide, with hydrogen sulfide at the relatively low, few thousands of ppm level. Despite the fact that the ratio of the carbon dioxide content to the hydrogen sulfide content is high (about 400:1), the raw gas stream must be passed through a minimum of four membrane stages, arranged in a three-step, two-stage configuration, to achieve good hydrogen sulfide removal. The goal is not to bring the raw gas stream to natural gas pipeline specification, but rather to recover relatively pure carbon dioxide, free from hydrogen sulfide, for further use in EOR. The target concentration of carbon dioxide in the treated hydrocarbon stream is less than 10%, which would, of course, not meet natural gas pipeline standards. The methane left in the residue stream after higher hydrocarbon removal is simply used to strip carbon dioxide from hydrogen-sulfide-rich solvent in a later part of the separation process; no methane passes to a natural gas pipeline. Despite the multistep/multistage membrane arrangement, in a representative example, about 7% carbon dioxide is left in the hydrocarbon residue stream after processing, and about 12% hydrocarbon loss into the permeate takes place.

A number of references deal with dehydration, but without simultaneously addressing hydrogen sulfide removal. For example, a recent report from W. R. Grace to the Gas Research Institute ("Gas Dehydration by Membranes—Industrial feasibility", T. E. Sulpizio and B. S. Minhas, Project #5729, June 1993) discusses the ability of conventional cellulose acetate and other unspecified experimental membranes to dehydrate natural gas. No data or discussion of streams containing hydrogen sulfide are given. U.S. Pat. Nos. 4,783,201, to Rice and Murphy and 4,497,640 to F. Fournié et al. both describe dehydration of air or methane using various types of membranes. Again, no data or discussion of hydrogen sulfide are included. U.S. Pat. No. 4,781,733, to W. C. Babcock et al., shows water vapor/methane gas mixture data, but reports only pure gas, low-pressure data for hydrogen sulfide.

In summary, it may be seen that there remains a need for improved membranes and improved processes for handling streams containing methane, acid gas components and water vapor.

SUMMARY OF THE INVENTION

The invention provides improved membranes and improved membrane processes for treating gas streams containing hydrogen sulfide, carbon dioxide, water vapor and methane, particularly natural gas streams. The processes rely on the availability of two membrane types: one, cellulose acetate, or a material with similar properties, characterized by a mixed gas carbon dioxide/methane selectivity of about 20 and a mixed gas hydrogen sulfide/methane selectivity of about 25; the other an improved membrane with a much higher mixed gas hydrogen sulfide/methane selectivity of at least about 30, 35 or 40 and a mixed gas carbon dioxide/methane selectivity of at least about 12. These selectivities must be achievable with gas streams containing at least methane, carbon dioxide and hydrogen sulfide and at feed pressures of at least 500 psig, more preferably 800 psig, most preferably 1,000 psig.

An important aspect of the invention is the availability of membranes with much higher hydrogen sulfide/methane selectivities than cellulose acetate. This provides the flexibility to choose between the membrane with the higher carbon dioxide/methane selectivity, in treating streams containing little hydrogen sulfide relative to carbon dioxide; the membrane with the higher hydrogen sulfide/methane selectivity, in treating streams containing substantial amounts of hydrogen sulfide relative to carbon dioxide; and a mixed membrane configuration in treating streams in the intermediate category.

The availability of the two membrane types enables treatment processes balanced in terms of the two membranes, so as to optimize any process attribute accordingly, to be designed. Based on the different permeation properties of the two membrane types, we have discovered that it is possible, through computer modeling, to define gas composition zones in which a particular treatment process is favored. For example, if it is the primary goal to minimize methane loss in the membrane permeate, it may be better to carry out the treatment using only the more hydrogen-sulfide-selective membrane, only the more carbon-dioxide-selective membrane or a mixture of both, depending on the particular feed gas composition. Similar determinations may be made if the amount of membrane area used is to be minimized, the costs and energy of recompression are to be kept below a target value, the hydrogen sulfide concentration in the permeate is to be maximized, the overall operating costs are to be reduced, or any other membrane process attribute is to be the key design factor.

As specific examples of this general teaching, we have discovered that:

1. If the feed gas to the membrane system contains less than about 3% carbon dioxide to less than about 10% carbon dioxide and more than about 10 ppm hydrogen sulfide to more than about 300 ppm hydrogen sulfide, with the lower end of the carbon dioxide range corresponding to the lower end of the hydrogen sulfide range (<3% carbon dioxide; >10 ppm hydrogen sulfide) and the upper end of the carbon dioxide range corresponding to the upper end of the hydrogen sulfide range (<10% carbon dioxide; >300 ppm hydrogen sulfide), then the most favorable process, in terms of minimizing methane loss, is carried out using the more hydrogen-sulfide-selective membrane only. Likewise, if the feed gas contains less than about 10% carbon dioxide to less than about 20% carbon dioxide and more than about 300 ppm hydrogen sulfide to more than about 600 ppm hydrogen sulfide, or less than about 20% carbon dioxide to less than about 40% carbon dioxide and more than about 600 ppm hydrogen sulfide to more than about 1% hydrogen sulfide, with the lower and upper ends of the ranges corresponding as before, the most favorable process will use the more hydrogen-sulfide-selective membrane only.

2. If the feed gas contains less than about 5 ppm hydrogen sulfide to less than about 50 ppm hydrogen sulfide and more than about 3% carbon dioxide to more than about 15% carbon dioxide, with the lower end of the carbon dioxide range corresponding to the lower end of the hydrogen sulfide range (<5 ppm hydrogen sulfide; >3% carbon dioxide) and the upper end of the carbon dioxide range corresponding to the upper end of the hydrogen sulfide range (<50 ppm hydrogen sulfide; >15% carbon dioxide), then the most favorable process, in terms of minimizing methane loss, is carried out using the more carbon-dioxide-selective membrane only. Likewise, if the feed gas contains less than about 50 ppm hydrogen sulfide to less than about 250 ppm hydrogen sulfide and more than about 15% carbon dioxide to more than about 50% carbon dioxide, or less than about 250 ppm hydrogen sulfide to less than about 500 ppm hydrogen sulfide and more than about 50% carbon dioxide to more than about 85% carbon dioxide, with the lower and upper ends of the ranges corresponding as before, the most favorable process will use the more carbon-dioxide-selective membrane only.

3. For feed gas compositions outside the ranges specified in points 1 and 2 above, the most favorable process, in terms of minimizing methane loss, is carried out using a combination of the more hydrogen-sulfide-selective and the more carbon-dioxide-selective membranes.

If a combination of the two membrane types is to be used, the preferred configuration is to pass the gas stream first through modules containing the one membrane type, then to pass the residue stream from the first bank of modules through a second bank containing membranes of the other type. If the raw gas stream contains significant amounts of water, for example, it is preferable to use the more hydrogen-sulfide-selective membrane first. These membranes are not usually damaged by water, and can handle gas streams having very high relative humidities, up to saturation. Furthermore, the membranes are very permeable to water vapor, and so can be used to dehydrate the gas stream before it passes to the second bank of modules.

Thus, another aspect of the invention is the dehydration capabilities of the more hydrogen-sulfide-selective membranes. If the stream to be treated contains essentially no carbon dioxide, or an acceptably low level of carbon dioxide, processes using this membrane alone can be configured to simultaneously meet both the hydrogen sulfide and the water vapor specifications of a gas pipeline. If the stream to be treated contains moderate quantities of carbon dioxide within the limits specified above, processes using this membrane alone can be configured to simultaneously meet the hydrogen sulfide, water vapor and carbon dioxide pipeline specifications. Where more carbon dioxide is present, pipeline specification can be met by combining the two membranes types, using the more hydrogen-sulfide-selective membrane upstream as the dehydration and principal hydrogen sulfide removal membrane.

Any membranes that can achieve the necessary carbon dioxide/methane and hydrogen sulfide/methane selectivities under mixed gas, high-pressure conditions, plus provide commercially useful transmembrane fluxes, can be used. The most preferred material for the more carbon-dioxide-selective membrane is cellulose acetate or its variants. The most preferred material for the more hydrogen-sulfide-selective membrane is a polyamide-polyether block copolymer having the general formula

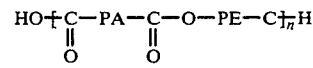

where PA is a polyamide segment, PE is a polyether segment and n is a positive integer. Such polymers are available commercially as Pebax ® from Atochem Inc., Glen Rock, N.J. or as Vestamid ® from Nuodex Inc., Piscataway, N.J.

In their most basic embodiments, the processes of the invention make use of a one-stage membrane design, if a single membrane type is indicated, and a two-step membrane design, in which the residue from the first step becomes the feed for the second step, if a combination of membrane types is indicated. It is possible, however, to optimize the process in light of the various aspects of gas treatment discussed above, namely removal of impurities, loss of methane, and ultimate fate of the impurities. To simultaneously meet pipeline specifications, minimize methane loss and produce a waste stream containing a high hydrogen sulfide concentration, it may be desirable, for example, to use a two-stage (or more complicated) membrane configuration, in which the permeate from the first stage becomes the feed for the second. This will both increase the concentration of hydrogen sulfide in the second stage permeate and reduce the methane loss.

The membrane process may also be combined with one or more non-membrane processes, to provide a treatment scheme that delivers pipeline quality methane, on the one hand, and that concentrates and disposes of the acid-gas-laden waste stream, in an environmentally acceptable manner, on the other.

The processes of the invention exhibit a number of advantages compared with previously available acid gas treatment technology. First, provision of a membrane with much higher selectivity for hydrogen sulfide over methane makes it possible, for the first time, to apply membrane treatment efficiently to gas streams characterized by relatively high concentrations of hydrogen sulfide. Secondly, the processes are much better at handling gas streams of high relative humidity. Thirdly, it is sometimes possible to bring a natural gas stream into pipeline specifications for all three of carbon dioxide, hydrogen sulfide and water vapor with a single membrane treatment. Fourthly, overprocessing of the gas stream by removing the carbon dioxide to a much greater extent than is actually necessary, simply to bring the hydrogen sulfide content down, can be avoided. Fifthly, much greater flexibility to adjust membrane operating and performance parameters is provided by the availability of two types of membranes. Sixthly, the process can be optimized for any chosen process attribute by calculating the appropriate membrane mix to use.

DETAILED DESCRIPTION OF THE INVENTION

Figure 1:
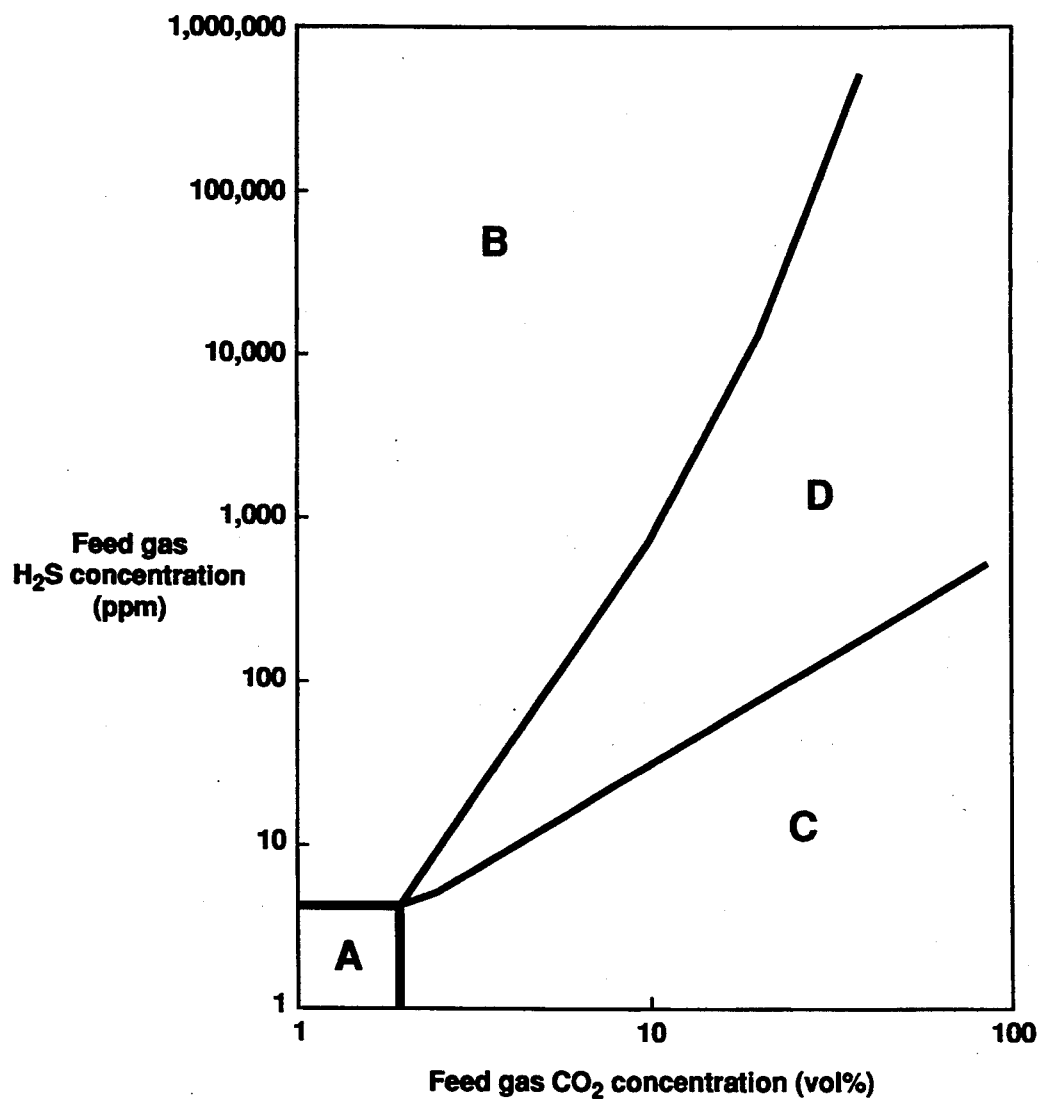
FIG. 1 is a diagram showing zones in which particular membranes should be used to separate hydrogen sulfide and carbon dioxide from methane.

The term intrinsic selectivity, as used herein, means the selectivity of the polymer material itself, calculated as the ratio of the permeabilities of two gases or vapors through a thick film of the material, as measured with pure gas or vapor samples.

The term ideal selectivity, as used herein, means the selectivity of a membrane, calculated as the ratio of the permeabilities of two gases or vapors through the membrane, as measured with pure gas or vapor samples.

The terms mixed gas selectivity and actual selectivity, as used herein, mean the selectivity of a membrane, calculated as the ratio of the permeabilities of two gases or vapors through the membrane, as measured with a gas mixture containing at least the two gases or vapors in question.

The invention has several aspects. In one aspect, the invention concerns processes for treating gas mixtures containing carbon dioxide in certain concentrations, hydrogen sulfide in certain concentrations and methane, to remove the carbon dioxide and hydrogen sulfide. In another aspect, the invention concerns optimizing such membrane separation processes in terms of a particular process attribute. This optimizing may be done to minimize the methane loss from the membrane process, to maximize the hydrogen sulfide concentration in the permeate stream, or to provide the best fit between the membrane process and a non-membrane process or processes acting together as a "hybrid" process, for example. In yet another aspect, the invention concerns membranes that maintain high hydrogen sulfide/methane selectivities when challenged with mixed gas streams under high pressures. In yet another aspect, the invention concerns membranes and processes that combine good dehydration capabilities with good hydrogen sulfide removal capabilities.

The processes of the invention rely on the availability of two membrane types: one, cellulose acetate, or a material with similar properties, characterized by a mixed gas carbon dioxide/methane selectivity of about 20 and a mixed gas hydrogen sulfide/methane selectivity of about 25; the other a membrane with a much higher mixed gas hydrogen sulfide/methane selectivity of at least about 30, 35 or 40 and a mixed gas carbon dioxide/methane selectivity of at least about 12. These selectivities must be achievable with gas streams containing at least methane, carbon dioxide and hydrogen sulfide and at feed pressures of at least 500 psig, more preferably 800 psig, most preferably 1,000 psig.

The invention provides three forms of basic membrane treatment process:

1. Using only the more hydrogen-sulfide-selective membrane
2. Using only the more carbon-dioxide-selective membrane
3. Using a combination of both types of membrane.

Based on the different permeation properties of the two membrane types, we have discovered that it is possible, through computer modeling, to define gas composition zones most amenable to each one of these three types of basic processes. In performing the computer calculation, a specific process attribute is used as a basis for calculating the boundaries of the gas composition zones. It will be apparent to those of ordinary skill in the art that any one of many process attributes could serve as the basis for the calculation. Representative, non-limiting, examples include methane loss, membrane area, stage cut, energy consumption, annual operating costs, permeate composition, residue composition, best match with other processes in the treatment train, volume/composition of recycle streams, and so on.

Loss of methane is usually one of the most important factors in natural gas processing. On the one hand, pipeline grade methane is the desired product, and substantial losses of product have a substantial adverse effect on the process economics. On the other hand, large quantities of methane in the acid gas stream make further handling and recovery of any useful products from this stream much more difficult. As a general rule, a successful natural gas treatment process should keep methane losses during processing to no more than about 10%, and preferably no more than about 5%.

For simplicity, therefore, most of the discussion and examples have been directed to processes designed to minimize methane losses, although it should be appreciated that the scope of the invention is intended to encompass any process design calculations done with the same goal, namely, defining zones applicable to the various processing options made possible by the two membrane types.

We believe the concept of these zones, how to calculate them and how to use them, is new, and will be useful in treating any gas stream that comprises methane, carbon dioxide and hydrogen sulfide. Such streams arise from natural gas wells, from carbon dioxide miscible flooding for enhanced oil recovery (EOR) and from landfills, for example. We believe that it will be particularly useful in the sweetening of natural gas containing acid gas components.

Referring now to FIG. 1, this shows a typical zone diagram, with feed gas carbon dioxide concentration on one axis and hydrogen sulfide concentration on the other. The diagram was prepared by running a series of membrane separation computer simulations for hypothetical three-component (methane, carbon dioxide, hydrogen sulfide) gas streams of particular flow rates and compositions. In all cases, the target was to bring the stream to a pipeline specification of 4 ppm hydrogen sulfide and 2% carbon dioxide. The membrane properties were assumed to be as follows:

| More CO₂-selective membrane: | |
|---|---|
| Carbon dioxide/methane selectivity: | 20 |
| Hydrogen sulfide/methane selectivity: | 25 |
| Methane flux: $7.5 \times 10^{-6}$ cm³(STP)/cm².s.cmHg | |
| More H₂S-selective membrane: | |
| Carbon dioxide/methane selectivity: | 13 |
| Hydrogen sulfide/methane selectivity: | 50 |
| Methane flux: $7.5 \times 10^{-6}$ cm³(STP)/cm².s.cmHg | |

Figure 9:
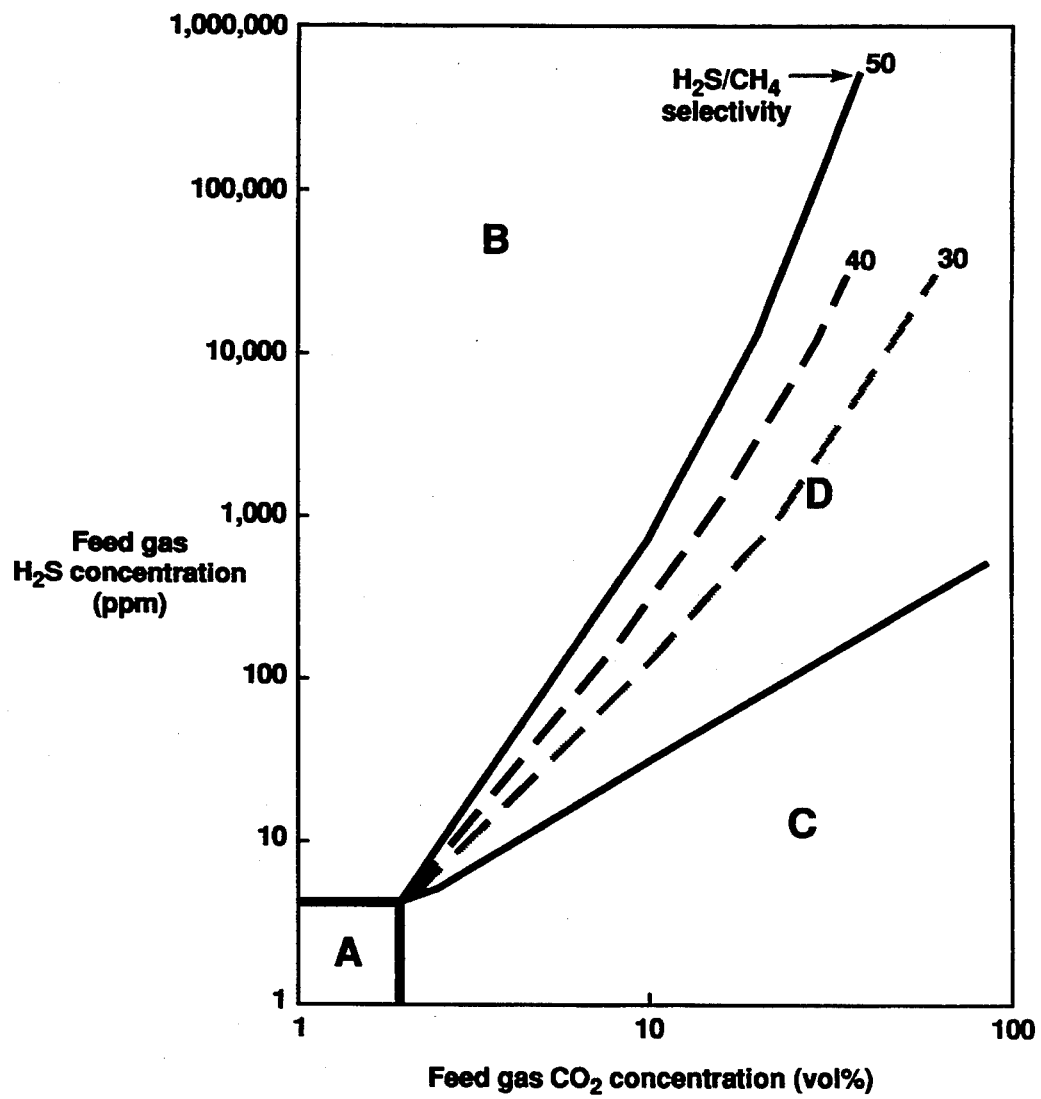
FIG. 9 is a diagram showing zones in which particular membranes should be used to separate hydrogen sulfide and carbon dioxide from methane, based on different hydrogen sulfide/methane selectivities.
Figure 10:
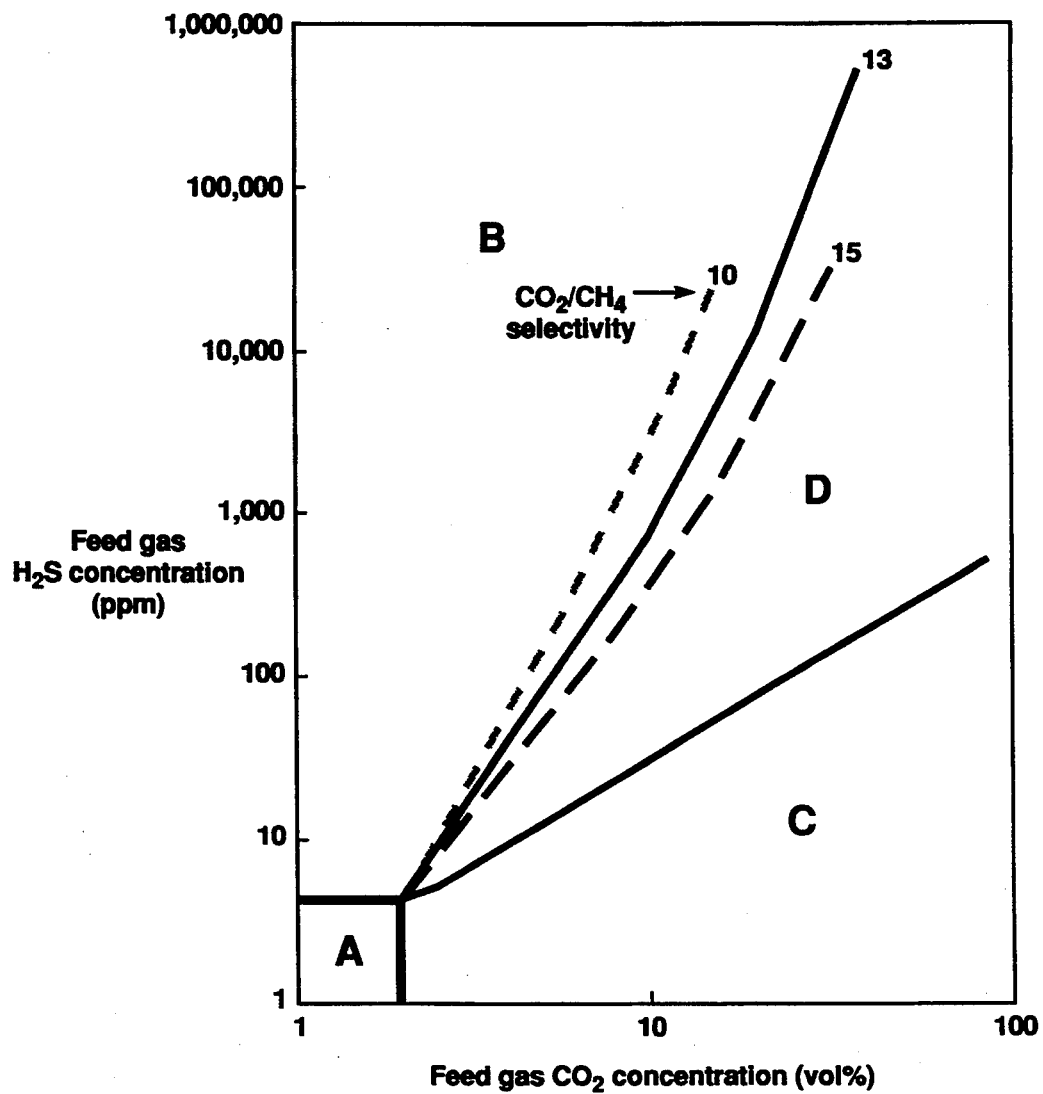
FIG. 10 is a diagram showing zones in which particular membranes should be used to separate hydrogen sulfide and carbon dioxide from methane, based on different carbon dioxide/methane selectivities.
Figure 11:
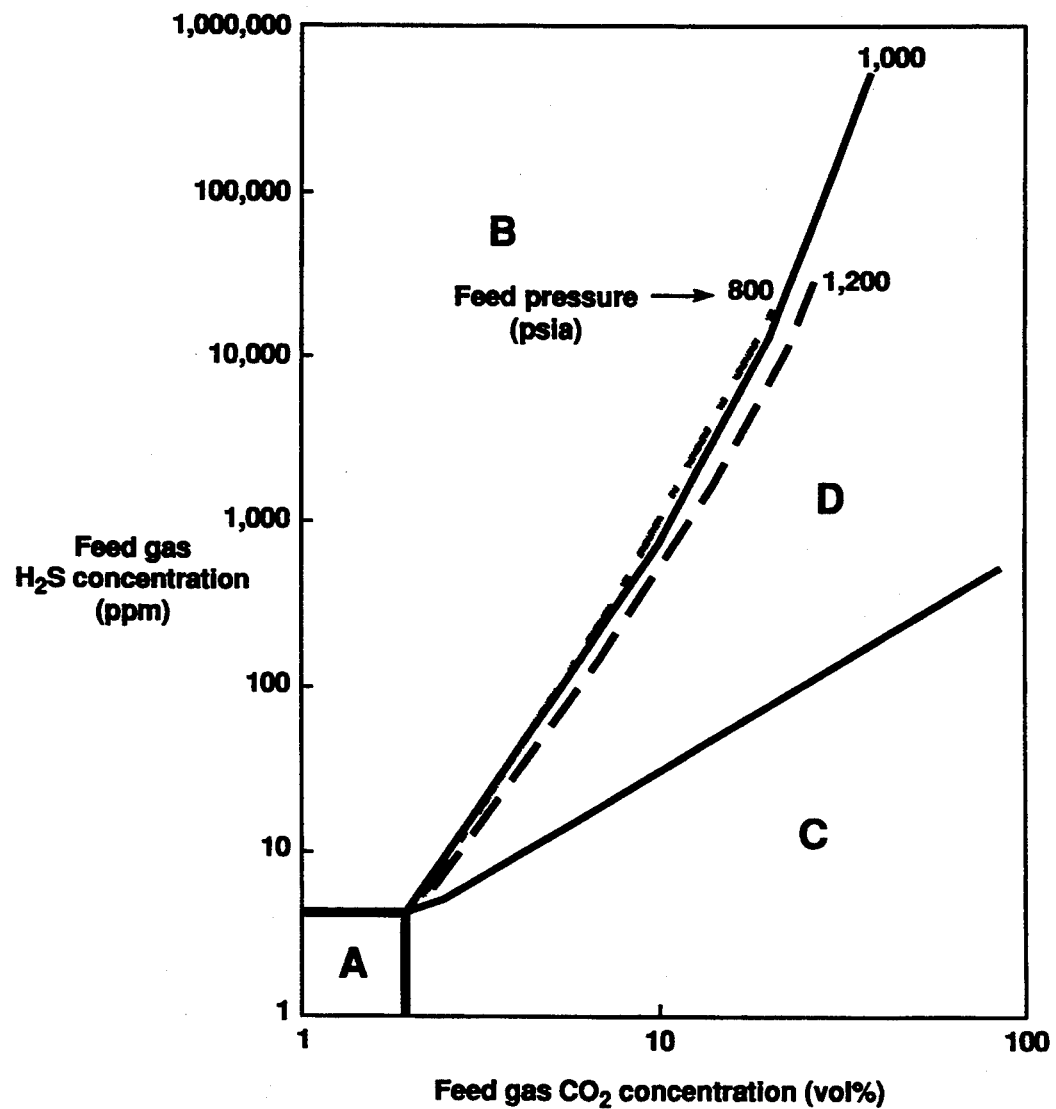
FIG. 11 is a diagram showing zones in which particular membranes should be used to separate hydrogen sulfide and carbon dioxide from methane, for different feed gas pressures.

In each case, the methane loss into the permeate stream that would occur if a one-stage membrane separation process were to be carried out was calculated, and was used to define zones of least methane loss. As can be seen, FIG. 1 is divided into four zones. In zone A, no treatment is required, because the gas already contains less than 2% carbon dioxide and less than 4 ppm hydrogen sulfide. In zone B, methane loss is minimized if the more hydrogen-sulfide-selective membrane alone is used. In zone C, methane loss is minimized if the more carbon-dioxide-selective membrane alone is used. In zone D, methane loss is minimized by using a combination of the two membrane types. The zones are calculated based on the membrane selectivity and their exact position will change if the membrane selectivity changes. FIGS. 9 and 10 show the change in the B/D boundary for hydrogen sulfide/methane selectivities of 30, 40 and 50 and for carbon dioxide/methane selectivities of 10, 13 and 15. As can be seen, the Zone B/D boundary moves to the right as the ability of the membrane to separate carbon dioxide improves. Likewise, the boundary moves to the right as the selectivity for hydrogen sulfide over methane decreases. Although the area where the more hydrogen-sulfide-selective membranes should be used is larger at lower hydrogen sulfide/methane selectivity, the methane losses encountered in using the membrane will be greater. FIG. 11 shows the change in the B/D boundary for different feed pressures. As can be seen, the zone boundary is relatively insensitive to changes in the feed pressure.

The zone diagram may be used directly to determine the best type of membrane to use for a specific separation by reading off the zone into which the feed composition fits.

Another way to use the diagram is to define concentration bands that can serve as guidelines in selecting a membrane process. Again referring to FIGS. 1, 9, 10 and 11, we have discovered that, as a guide, three carbon dioxide concentration bands may be defined, thus:

1. (a) If the feed gas to the membrane system contains less than about 3% carbon dioxide to less than about 10% carbon dioxide and more than about 10 ppm hydrogen sulfide to more than about 300 ppm hydrogen sulfide, with the lower end of the carbon dioxide range corresponding to the lower end of the hydrogen sulfide range (<3% carbon dioxide; >10 ppm hydrogen sulfide) and the upper end of the carbon dioxide range corresponding to the upper end of the hydrogen sulfide range (<10% carbon dioxide; >300 ppm hydrogen sulfide), then the most favorable process, in terms of minimizing methane loss, is carried out using the more hydrogen-sulfide-selective membrane only.

(b) If the feed gas contains less than about 10% carbon dioxide to less than about 20% carbon dioxide and more than about 300 ppm hydrogen sulfide to more than about 600 ppm hydrogen sulfide, with the lower end of the carbon dioxide range corresponding to the lower end of the hydrogen sulfide range (<10% carbon dioxide; >300 ppm hydrogen sulfide) and the upper end of the carbon dioxide range corresponding to the upper end of the hydrogen sulfide range (<20% carbon dioxide; >600 ppm hydrogen sulfide), then the most favorable process, in terms of minimizing methane loss, is carried out using the more hydrogen-sulfide-selective membrane only.

(c) If the feed gas contains less than about 20% carbon dioxide to less than about 40% carbon dioxide and more than about 600 ppm hydrogen sulfide to more than about 1% hydrogen sulfide, with the lower end of the carbon dioxide range corresponding to the lower end of the hydrogen sulfide range (<20% carbon dioxide; >600 ppm hydrogen sulfide) and the upper end of the carbon dioxide range corresponding to the upper end of the hydrogen sulfide range (<40% carbon dioxide; >1% hydrogen sulfide), then the most favorable process, in terms of minimizing methane loss, is carried out using the more hydrogen-sulfide-selective membrane only.

Also, three hydrogen sulfide concentration bands may be defined, thus:

2. (a) If the feed gas contains less than about 5 ppm hydrogen sulfide to less than about 50 ppm hydrogen sulfide and more than about 3% carbon dioxide to more than about 15% carbon dioxide, with the lower end of the carbon dioxide range corresponding to the lower end of the hydrogen sulfide range (<5 ppm hydrogen sulfide; >3% carbon dioxide) and the upper end of the carbon dioxide range corresponding to the upper end of the hydrogen sulfide range (<50 ppm hydrogen sulfide; >15% carbon dioxide), then the most favorable process, in terms of minimizing methane loss, is carried out using the more carbon-dioxide-selective membrane only.

(b) If the feed gas contains less than about 50 ppm hydrogen sulfide to less than about 250 ppm hydrogen sulfide and more than about 15% carbon dioxide to more than about 50% carbon dioxide, with the lower end of the carbon dioxide range corresponding to the lower end of the hydrogen sulfide range (<50 ppm hydrogen sulfide; >15% carbon dioxide) and the upper end of the carbon dioxide range corresponding to the upper end of the hydrogen sulfide range (<250 ppm hydrogen sulfide; >50% carbon dioxide), then the most favorable process, in terms of minimizing methane loss, is carried out using the more carbon-dioxide-selective membrane only.

(c) If the feed gas contains less than about 250 ppm hydrogen sulfide to less than about 500 ppm hydrogen sulfide and more than about 50% carbon dioxide to more than about 85% carbon dioxide, with the lower end of the carbon dioxide range corresponding to the lower end of the hydrogen sulfide range (<250 ppm hydrogen sulfide; >50% carbon dioxide) and the upper end of the carbon dioxide range corresponding to the upper end of the hydrogen sulfide range (<500 ppm hydrogen sulfide; >85% carbon dioxide), then the most favorable process, in terms of minimizing methane loss, is carried out using the more carbon-dioxide-selective membrane only.

Also:

3. For feed gas compositions outside the ranges specified in points 1 and 2 above, the most favorable process, in terms of minimizing methane loss, is carried out using a combination of the more hydrogen-sulfide-selective and the more carbon-dioxide-selective membranes.

For instance, using either the zone diagram itself or these concentration bands:
  (i) If the carbon dioxide content of the stream is 4.5%, and the hydrogen sulfide content is 1,500 ppm, the more hydrogen-sulfide-selective membrane only should be used.
  (ii) If the carbon dioxide content of the stream is 4.5% and the hydrogen sulfide content is 7 ppm, the more carbon-dioxide selective membrane only should be used.
  (iii) If the carbon dioxide content of the stream is 4.5% and the hydrogen sulfide content is 25 ppm, a combination membrane system should be used.
  (iv) If the carbon dioxide content of the stream is 7% and the hydrogen sulfide content is 10,000 ppm, the more hydrogen-sulfide-selective membrane only should be used.
  (v) If the carbon dioxide content of the stream is 7% and the hydrogen sulfide content is 2 ppm (already within spec.), the more carbon-dioxide-selective membrane only should be used.
  (vi) If the carbon dioxide content of the stream is 7% and the hydrogen sulfide content is 50 ppm, a combination membrane system should be used.
  (vii) If the carbon dioxide content of the stream is 10% and the hydrogen sulfide content is 1,000 ppm, the more hydrogen-sulfide-selective membrane only should be used.
  (viii) If the carbon dioxide content of the stream is 10% and the hydrogen sulfide content is 20 ppm, the more carbon-dioxide-selective membrane only should be used.
  (ix) If the carbon dioxide content of the stream is 10%, and the hydrogen sulfide content is 100 ppm, a combination membrane system should be used.
  (x) If the carbon dioxide content of the stream is 16% and the hydrogen sulfide content is 7,000 ppm, the more hydrogen-sulfide-selective membrane only should be used.
  (xi) If the carbon dioxide content of the stream is 16% and the hydrogen sulfide content is 8 ppm, the more carbon-dioxide-selective membrane only should be used.
  (xii) If the carbon dioxide content of the stream is 16%, and the hydrogen sulfide content is 250 ppm, a combination membrane system should be used.
  (xiii) If the carbon dioxide content of the stream is 25% and the hydrogen sulfide content is 10%, the more hydrogen-sulfide-selective membrane only should be used.
  (xiv) If the carbon dioxide content of the stream is 25% and the hydrogen sulfide content is 50 ppm, the more carbon-dioxide-selective membrane only should be used.
  (xv) If the carbon dioxide content of the stream is 25%, and the hydrogen sulfide content is 500 ppm, a combination membrane system should be used.
  (xvi) If the carbon dioxide content of the stream is about 50–60% or more, the more hydrogen-sulfide-selective membrane should not be used alone, no matter how high the hydrogen sulfide content.
  (xvii) If the carbon dioxide content of the stream is 40% and the hydrogen sulfide content is 120 ppm, the more carbon-dioxide selective membrane only should be used.
  (xviii) If the carbon dioxide content of the stream is 40%, and the hydrogen sulfide content is 2,000 ppm, a combination membrane system should be used.
  (xix) If the hydrogen sulfide content of the stream is about 600 ppm or more, the more carbon-dioxide-selective membrane should not be used alone, no matter how high the carbon dioxide content.
  (xx) If the carbon dioxide content of the stream is 70%, a combination membrane system should always be used if the hydrogen sulfide content is above about 500 ppm.

The discussion of the zone diagram and the specific instances of what it teaches for twenty different gas compositions is deliberately fairly lengthy, so as to cover examples in the mid-ranges and near the edges of the bands and zones.

Another way to express the teachings of the invention is simply to define single limits for the carbon dioxide and hydrogen sulfide concentrations that are best treated by different types of membrane. This approach gives a less accurate result in any individual circumstance than the zone or band approaches, but gives a broad guide that is useful irrespective of the particular process attribute that is of most concern. Specifically:
  1. If the carbon dioxide content of the stream is less than about 40% and the hydrogen sulfide content is more than about 6,000 ppm (1%), the more hydrogen-sulfide-selective membrane should be used.
  2. If the carbon dioxide content of the stream is less than about 20% and the hydrogen sulfide content is more than about 500 ppm, the more hydrogen-sulfide-selective membrane should be used.
  3. If the carbon dioxide content of the stream is less than about 10% and the hydrogen sulfide content is more than about 10 ppm, the more hydrogen-sulfide-selective membrane should be used.
  4. If the hydrogen sulfide content of the stream is less than about 25 ppm and the carbon dioxide content is more than about 10%, the more carbon-dioxide-selective membrane only should be used.
  5. If the hydrogen sulfide content of the stream is less than about 100 ppm and the carbon dioxide content is more than about 15%, the more carbon-dioxide-selective membrane only should be used.
  6. If the carbon dioxide content of the stream is in the range about 5–20% carbon dioxide and the hydrogen sulfide content is in the range 10–1,000 ppm, a combination membrane system may be used.
  7. If the carbon dioxide content of the stream is in the range about 10–25% carbon dioxide and the hydrogen sulfide content is in the range 50–5,000 ppm, a combination membrane system may be used.
  8. If the carbon dioxide content of the stream is greater than about 25% carbon dioxide and the hydrogen sulfide content is greater than about 200 ppm, a combination membrane system may be used.
  9. If the carbon dioxide content of the stream is greater than about 40% carbon dioxide and the hydrogen sulfide content is greater than about 600 ppm, a combination membrane system may be used.

If a combination of the two membrane types is to be used, the simplest configuration is to pass the gas stream first through modules containing the one membrane type, then to pass the residue stream from the first bank of modules through a second bank containing membranes of the other type. The order in which the membrane types are encountered by the gas stream can be chosen according to the specifics of the application. If the raw gas stream contains significant amounts of water and hydrogen sulfide, for example, it is preferable to use the more hydrogen-sulfide-selective membrane first, since cellulose acetate membranes have been shown to lose both selectivity and permeability substantially if exposed to combinations of water vapor and hydrogen sulfide. They also do not withstand relative humidities above about 30% very well. The polyamide-polyether block copolymer membranes that are preferred as the more hydrogen-sulfide-selective membrane, on the other hand, are not usually damaged by water or hydrogen sulfide, and can handle gas streams having high relative humidities, such as above 30% RH, above 70% RH, above 90% RH and even saturation. Furthermore, the membranes are very permeable to water vapor, and so can be used to dehydrate the gas stream before it passes to the second bank of modules.

Thus, the membrane dehydration capabilities are a very important aspect of the invention. It is normal to dehydrate gas destined for a pipeline, to prevent condensation and the formation of solid ice or solid hydrates in the pipeline, and thereby to avoid potentially serious problems, such as corrosion or plugging. The water vapor specification is expressed in a variety of units; typical values are 120–140 ppm, or 7 lb/MMscfd, or a dewpoint of 33° F. These standards can be met by the preferred types of more hydrogen-sulfide-selective membrane, which have water vapor/methane selectivities as high as 200, 500, 1,000 or more. In many cases, a feed stream with a relative humidity of 30%, 50%, 70%, 90% or essentially saturated can be dried to pipeline standards by the membrane treatment alone, without the need for additional pretreatment. In other words, the membranes can achieve a residue stream water vapor content of below 10% RH, preferably below 1% RH, or, in absolute terms, below 500 ppm, more preferably no greater than about 140 ppm, 120 ppm, or even as low as 80 ppm or 20 ppm if needed, even when the feed stream has a high relative humidity.

If the stream to be treated contains essentially no carbon dioxide, or an acceptably low level of carbon dioxide, processes using the more hydrogen-sulfide-selective membrane alone can be configured to simultaneously meet both the hydrogen sulfide and the water vapor specifications of a gas pipeline. If the stream to be treated contains moderate quantities of carbon dioxide within the limits specified above, processes using this membrane alone can be configured to simultaneously meet the hydrogen sulfide, water vapor and carbon dioxide pipeline specifications. Where more carbon dioxide is present, pipeline specification can be met by combining the two membranes types, using the more hydrogen-sulfide-selective membrane upstream as the dehydration and principal hydrogen sulfide removal membrane.

If humidity and hydrogen sulfide content are not issues, and no other factors that affect only one of the membrane types are at work, then the total methane loss into the permeate streams and the total membrane area required to perform the separation should be essentially independent of the order in which the membranes are positioned.

Any membranes that can achieve the necessary carbon dioxide/methane selectivity and hydrogen sulfide/methane selectivity, plus commercially useful transmembrane fluxes, can be used. Preferably the membranes should be characterized by transmembrane methane fluxes of at least $1 \times 10^{-6}$ cm$^3$(STP)/cm$^2$.s.cmHg, most preferably by transmembrane methane fluxes of at least $1 \times 10^{-5}$ cm$^3$(STP)/cm$^2$.s.cmHg.

For the more carbon-dioxide-selective membrane, the preferred membranes are the cellulose acetate membranes that are already in use. Other candidates include different cellulose derivatives, such as ethylcellulose, methylcellulose, nitrocellulose and particularly other cellulose esters. Otherwise, membranes might be made from polysulfone, polyethersulfone, polyamides, polyimides, polyetherimides, polyacrylonitrile, polyvinylalcohol, other glassy materials or any other appropriate material. Usually, glassy materials have enough mechanical strength to be formed as integral asymmetric membranes, the production of which is well known in the art. The invention is not intended to be limited to any particular membrane material or membrane type, however, and encompasses any membrane, of any material, that is capable of meeting the target permeation properties, including, for example, homogeneous membranes, composite membranes, and membranes incorporating sorbents, carriers or plasticizers.

For the more hydrogen-sulfide-selective membrane, the most preferred membranes have hydrophilic, polar elastomeric selective layers. The mobility selectivity of such materials, although it favors hydrogen sulfide and carbon dioxide over methane, is modest compared to glassy materials. Because the membrane is hydrophilic and polar, however, the sorption selectivity strongly favors hydrogen sulfide, carbon dioxide and water vapor over non-polar hydrophobic gases such as hydrogen, methane, propane, butane, etc. Although the selectivity of such materials is affected by swelling in the presence of condensable components, we have discovered that hydrogen sulfide/methane selectivities of at least 30 or 35, sometimes at least 40 and sometimes 50, 60 or above can be maintained, even with gas mixtures containing high acid gas concentrations, even at high relative humidity, and even at very high feed pressures up to 500 psig, 800 psig, 1,000 psig or above. These are unusual and very useful properties. These properties render the membranes unusually suitable for treating natural gas, which often contains multiple components, has high humidity and is at high pressure. Preferred membrane materials exhibit water sorption greater than 5%, more preferably greater than 10%, when exposed to liquid water at room temperature. Particularly preferred are segmented or block copolymers that form two-domain structures, one domain being a soft, rubbery, hydrophilic region, the other being harder and glassy or more glassy. Without wishing to be bound by any particular theory of gas transport, we believe that the soft, rubbery domains provide a preferential pathway for the hydrogen sulfide and carbon dioxide components; the harder domains provide mechanical strength and prevent excessive swelling, and hence loss of selectivity, of the soft domains. Polyether blocks are preferred for forming the soft flexible domains; most preferably these blocks incorporate polyethylene glycol, polytetramethylene glycol or polypropylene glycol, to increase the sorption of polar molecules by the membrane material.

One specific example of the most preferred membrane materials that could be used for the more hydrogen-sulfide selective membrane is polyamide-polyether block copolymers having the general formula

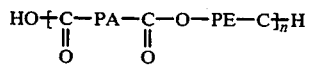

where PA is a polyamide segment, PE is a polyether segment and n is a positive integer. Such polymers are available commercially as Pebax ® from Atochem Inc., Glen Rock, N.J. or as Vestamid ® from Nuodex Inc., Piscataway, N.J. The polyamide block gives strength and is believed to prevent the membrane swelling excessively in the presence of water vapor and/or carbon dioxide.

Other specific examples include polyether- and polyester-based polyurethanes. Representative polymer formulations and recipes are given, for example, in U.S. Pat. No. 5,096,592, in which the copolymers are made by first preparing a prepolymer by combining simple diols and aliphatic or aromatic dicarboxylic acids with an excess of diacid to prepare diacid-terminated blocks, then chain-extending these with appropriately selected polypropylene or polyethylene glycol segments.

Usually, rubbery materials do not have enough mechanical strength to be formed as integral asymmetric membranes, but are instead incorporated into composite membranes, in which the rubbery selective layer is supported on a microporous substrate, often made from a glassy polymer. The preparation of composite membranes is also well known in the art. It is commonly thought that rubbery composite membranes do not withstand high-pressure operation well, and to date, such membranes have not been generally used in natural gas treatment, where feed gas pressures are often as high as 500 psig or 1,000 psig. We have found, however, that composite membranes, with thin enough rubbery selective layers to provide a transmembrane methane flux of at least $1 \times 10^{-6}$ cm$^3$(STP)/cm$^2$.s.cmHg, can be used satisfactorily at high feed pressures and not only maintain their integrity but continue to exhibit high selectivity for hydrogen sulfide over methane and good dehydration properties.

In their most basic embodiments, the processes of the invention make use of a one-stage membrane design if a single membrane type is indicated, and a two-step membrane design, in which the residue from the first step becomes the feed for the second step, if a combination of membrane types is indicated. It will be apparent to those of ordinary skill in the art that more sophisticated embodiments are possible. For example, a two-stage (or more complicated) membrane configuration, in which the permeate from the first stage becomes the feed for the second, may be used to further enrich the acid gas content of the permeate stream and to reduce methane losses. It is envisaged that a two-stage membrane configuration, using like or unlike membrane types in the two stages will often be used. In such arrangements, the residue stream from the second stage may be recirculated for further treatment in the first stage, or may be passed to the gas pipeline, for example.

In one-stage configurations, the residue stream may also be subjected to further membrane treatment. Both permeate and residue streams may be subjected to additional non-membrane treatment, such as in an amine plant, to bring it the residue stream to pipeline specification, for example. Given the diversity of flow rates, compositions and locations of natural gas wells, it is envisioned that the membrane separation process will often form part of a hybrid treatment scheme that delivers pipeline quality methane, on the one hand, and that concentrates and disposes of the acid-gas-laden waste stream, in an environmentally acceptable manner, on the other.

In the zone calculations, the target pipeline specification for the treated gas was assumed to be no more than about 2 vol % carbon dioxide and 4 ppm hydrogen sulfide, which is typical pipeline specification. However, depending on the destination of the gas and specific standards to which the gas is subject, it is believed that a carbon dioxide content below about 3 vol % and a hydrogen sulfide content below about 20 ppm will be acceptable in many situations.

The processes of the invention exhibit a number of advantages compared with previously available acid gas treatment technology. First, provision of a membrane with much higher selectivity for hydrogen sulfide over methane makes it possible, for the first time, to apply membrane treatment efficiently to gas streams characterized by relatively high concentrations of hydrogen sulfide compared to carbon dioxide. This expands the range of utility of membrane separation substantially. Since membrane systems are light, simple and low-maintenance compared with amine plants, the enhanced ability to use membranes as a treatment option facilitates the exploitation of gas fields off-shore or in remote locations. Secondly, the processes are much better at handling gas streams of high relative humidity, so that less pretreatment of the raw gas stream is necessary. Thirdly, it is sometimes possible to bring a natural gas stream into pipeline specifications for all three of carbon dioxide, hydrogen sulfide and water vapor with a single membrane treatment. This is a very improtant feature, which makes the processes of the invention clearly more attractive than using one process for dehydration, a second for carbon dioxide removal and a third for hydrogen sulfide removal. Fourthly, overprocessing of the gas stream by removing the carbon dioxide to a much greater extent than is actually necessary, simply to bring the hydrogen sulfide content down, can be avoided. Fifthly, much greater flexibility to adjust membrane operating and performance parameters is provided by the availability of two types of membranes. Sixthly, the process can be optimized for any chosen process attribute by calculating the appropriate membrane mix to use.

The invention is now further illustrated by the following examples, which are intended to be illustrative of the invention, but are not intended to limit the scope or underlying principles of the invention in any way.

EXAMPLES

The examples are in three sets.

SET 1

Examples 1 and 2 are comparative examples that show the behavior of cellulose acetate membranes in the presence of water vapor.

Example 1

Figure 3:
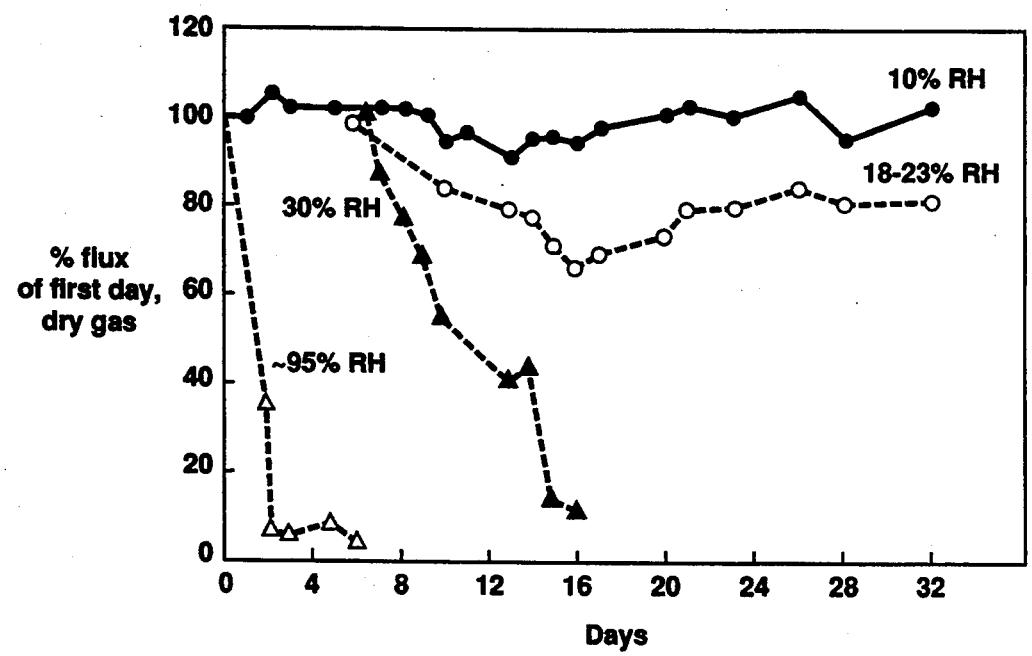
FIG. 3 is a graph showing the effect of water vapor on carbon dioxide flux through cellulose acetate membranes.

This comparative example is from the report by N. N. Li et al. to the Department of Energy ("Membrane Separation Processes in the Petrochemical Industry, Phase II Final Report, September 1987). Li et al. examined the effect of water vapor in a feed gas stream of carbon dioxide on transmembrane flux. FIG. 3, taken from the report summarizes their data. For relative humidity of 10% or less, there is no appreciable effect on the carbon dioxide flux. For relative humidities in the range 18–23%, the flux decreased 30% compared to the dry gas flux, but recovered when the feed was switched back to dry gas. For relative humidities of 30% and higher, the flux decline was found to be large, rapid and irreversible.

Example 2

Figure 4:
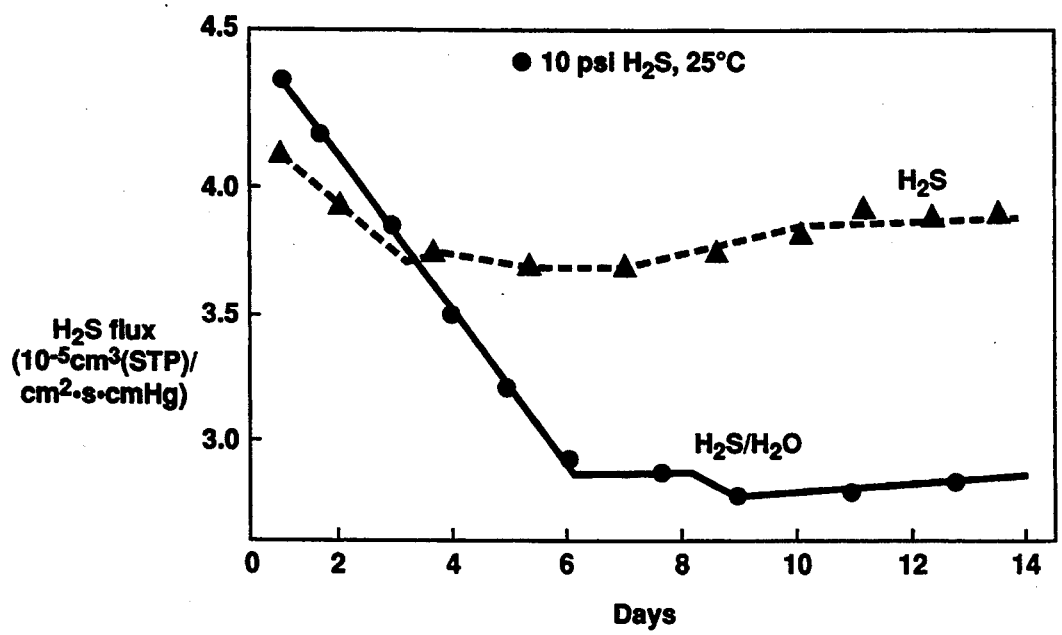
FIG. 4 is a graph showing the effects of hydrogen sulfide and water vapor on the performance of cellulose acetate membranes.

This example is also taken from the Li et al. report and shows the effects of water vapor plus hydrogen sulfide. FIG. 4 summarizes the data. Hydrogen sulfide has a negligible effect on membrane performance if the feed gas is dry. If both hydrogen sulfide and water vapor are present, however, the transmembrane flux is substantially reduced. Li et al. conclude that the processing of streams containing both high concentrations of hydrogen sulfide and water vapor must be avoided with cellulose acetate membranes.

SET 2

Examples 3 and 4 show the performance of polyamide-polyether membranes exposed to pure gases. These examples are from earlier work at Membrane Technology and Research, as already reported in U.S. Pat. No. 4,963,165, since we were not able to make measurements with pure hydrogen sulfide.

Example 3. Polyamide-polyether membranes. Pure gas data

A multilayer composite membrane was prepared by coating a polysulfone support membrane first with a thin high-flux, sealing layer, then with a 1 wt % solution of Pebax grade 4011 in i-butanol. The membrane was tested with pure gases at a temperature of 20° C. and a feed pressure of 50 psig. The results are shown in Table 2.

Example 4. Polyamide-polyether membranes. Pure gas data

A second membrane was prepared using the same materials and technique as in Example 3. The results of pure gas tests with this membrane are also shown in Table 2. There is good agreement between the sets of results from Examples 3 and 4.

TABLE 2

| | Permeation Properties of Pebax 4011 Composite Membranes Tested with Pure Gases | | | | |
|---|---|---|---|---|---|
| | | Pressure Normalized Flux × $10^6$[cm$^3$(STP)/(cm.s.cmHg)] | | | Membrane Selectivity |
| Ex. # | Feed Pressure (psig) | H$_2$S | CO$_2$ | CH$_4$ | H$_2$S/CH$_4$ | CO$_2$/CH$_4$ |
| 3 | 50 | 1,650 | 219 | 11.9 | 139 | 18 |
| 4 | 50 | 1,750 | 185 | 9.19 | 190 | 20 |

Examples 5–10 show the performance of polyamide-polyether membranes exposed to gas mixtures under a variety of conditions.

Example 5

A composite membrane was prepared by coating a layer of a polyamide-polyether copolymer (Pebax grade 4011) onto a polyvinylidene fluoride (PVDF) support membrane using the same general techniques as in Example 3. The membrane was tested with a two-component gas mixture containing 4 vol % carbon dioxide, 96 vol % methane at three different feed pressures: 392 psig, 589 psig and 960 psig. In all cases the permeate side of the membrane was at, or close to, atmospheric pressure and the membrane was at room temperature (23° C). The permeation results are listed in Table 3.

Example 6

The same type of membrane as in Example 5 was prepared and tested with a two-component gas mixture consisting of 970 ppm hydrogen sulfide, 99.9 vol % methane at three different feed pressures: 388 psig, 588 psig and 970 psig. In all cases the permeate side of the membrane was at, or close to, atmospheric pressure and the membrane was at room temperature (23° C). The permeation results are listed in Table 3.

Example 7

The same type of membrane as in Example 5 was prepared and tested with a three-component gas mixture consisting of 870 ppm hydrogen sulfide, 4.12 vol % carbon dioxide and 95.79 vol % methane at three different feed pressures: 386 psig, 589 psig and 974 psig. In all cases the permeate side of the membrane was at, or close to, atmospheric pressure and the membrane was at room temperature (23° C.). The permeation results are listed in Table 3.

Example 8

The same type of membrane as in Example 5 was prepared and tested with a three-component gas mixture consisting of 0.986 vol % hydrogen sulfide, 4.12 vol % carbon dioxide and 94.90 vol % methane at three different feed pressures: 389 psig, 586 psig and 971 psig. In all cases the permeate side of the membrane was at, or close to, atmospheric pressure and the membrane was at room temperature (23° C.). The permeation results are listed in Table 3.

Example 9

The same type of membrane as in Example 5 was prepared and tested with a three-component gas mixture consisting of 1.83 vol % hydrogen sulfide, 10.8 vol % carbon dioxide and 87.34 vol % methane at a feed pressure of 965 psig. The permeate side of the membrane was at, or close to, atmospheric pressure and the membrane was at room temperature (23° C.). The permeation results are listed in Table 3.

Example 10

The same type of membrane as in Example 5 was prepared and tested with a three-component gas mixture consisting of 950 ppm hydrogen sulfide, 8.14 vol % carbon dioxide and 91.77 vol % methane at three different feed pressures: 391 psig, 585 psig and 970 psig. In all cases the permeate side of the membrane was at, or close to, atmospheric pressure and the membrane was at room temperature (23° C.). The permeation results are listed in Table 3.

TABLE 3

Permeation Properties of a Pebax 4011 ® Composite Membrane with Various Feed Gas Compositions at Three Feed Pressures

| Ex. # | Feed Pressure (psig) | Pressure Normalized Flux × $10^6$[cm$^3$(STP)/(cm.s.cmHg)] | | | Membrane Selectivity | |
|---|---|---|---|---|---|---|
| | | $H_2S$ | $CO_2$ | $CH_4$ | $H_2S/CH_4$ | $CO_2/CH_4$ |
| 5 | 392 | — | 31 | 1.9 | — | 17 |
|   | 589 | — | 30 | 1.9 | — | 16 |
|   | 960 | — | 29 | 2.0 | — | 15 |
| 6 | 388 | 91 | — | 1.8 | 51 | — |
|   | 588 | 74 | — | 1.8 | 41 | — |
|   | 970 | 73 | — | 1.8 | 41 | — |
| 7 | 386 | 140 | 31 | 1.9 | 70 | 16 |
|   | 589 | 115 | 30 | 2.0 | 56 | 15 |
|   | 974 | 110 | 29 | 2.2 | 52 | 14 |
| 8 | 389 | 113 | 32 | 2.0 | 55 | 16 |
|   | 586 | 103 | 31 | 2.0 | 51 | 15 |
|   | 971 | 97 | 29 | 2.0 | 48 | 14 |
| 9 | 965 | 121 | 34 | 2.4 | 50 | 14 |
| 10 | 391 | 93 | 26 | 1.6 | 58 | 16 |
|   | 585 | 108 | 32 | 2.0 | 52 | 15 |
|   | 970 | 93 | 28 | 1.9 | 48 | 14 |

The following observations can be made from the data of Examples 5-10:

1. The presence of carbon dioxide in the feed gas appears to increase the fluxes of both hydrogen sulfide and methane through the membrane. For example, a comparison of the results of Example 6, in which the feed mixture did not contain any carbon dioxide, with those of Examples 7-10, shows that the hydrogen sulfide fluxes are about 25% lower and the methane fluxes are about 15% lower in Example 6. The increased flux may be due to swelling of the membrane by dissolved carbon dioxide.

2. In general, the pressure-normalized fluxes of hydrogen sulfide and carbon dioxide decrease with increasing feed pressure, whereas those of methane increase. The decrease in the hydrogen sulfide and carbon dioxide fluxes may be due to competitive sorption, which results in a lower solubility coefficient (the ratio of concentration in the polymer to partial pressure) for each component. At the same time, the polymer swells, resulting in a higher diffusivity for all components, including methane. The net result is an increase in the methane flux and a decrease in the fluxes of the acid gases (hydrogen sulfide and carbon dioxide).

3. The hydrogen sulfide/methane selectivity for three-component mixtures varies from a low of 48 to a high of 70, although all of the measurements were made at fairly high feed pressures. The carbon dioxide/methane selectivity, also at high pressure, is about 14-16.

Example 11. Gas streams containing water vapor

The experiments of Example 7 were repeated using feed gas streams saturated with water vapor by bubbling the feed gas through a water reservoir. The experiments were carried out at feed pressures of 387 psig, 588 psig and 970 psig. The permeate side of the membrane was at, or close to, atmospheric pressure and the membrane was at room temperature (23° C.). The permeation results are listed in Table 4.

TABLE 4

Permeation Properties of Pebax 4011 Composite Membranes Tested with Water-Saturated Gas Mixtures

| Ex. # | Feed Pressure (psig) | Pressure Normalized Flux × $10^6$[cm$^3$(STP)/(cm.s.cmHg)] | | | Membrane Selectivity | |
|---|---|---|---|---|---|---|
| | | $H_2S$ | $CO_2$ | $CH_4$ | $H_2S/CH_4$ | $CO_2/CH_4$ |
| 11 | 387 | 77.0 | 18.9 | 1.03 | 74.9 | 18.4 |
|    | 588 | 73.5 | 20.1 | 1.20 | 61.4 | 16.9 |
|    | 970 | 68.6 | 18.1 | 1.17 | 58.8 | 15.5 |

Comparing these results with those of Table 3, it can be seen that the fluxes are considerably lower (about 40–45% lower) than those obtained in the absence of water vapor. Neither the hydrogen sulfide/methane nor the carbon dioxide/methane selectivities, however, change significantly. Furthermore, when the membranes were retested with a dry gas stream, the fluxes returned to the original values.

SET 3

Examples 12–21 show representative process calculations performed using the experimentally determined membrane characteristics.

Example 12

Figure 2:
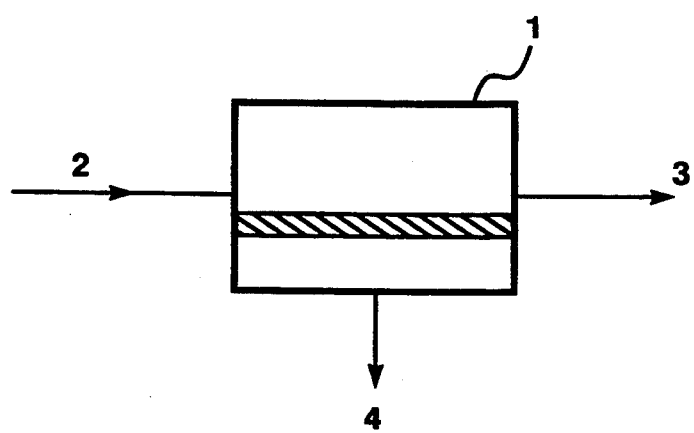
FIG. 2 is a basic schematic drawing of a one-stage membrane separation process.

A very simple one-stage membrane process was designed to handle a gas stream containing 100 ppm hydrogen sulfide, 0.1 vol % water vapor, 4 vol % carbon dioxide and the remainder methane, at a feed pressure of 1,000 psia. A basic schematic of the process is shown in FIG. 2, where numeral 1 indicates the bank of membrane modules, and the feed, residue and permeate streams are indicated by numerals 2, 3 and 4 respectively. The process was assumed to use one bank of more hydrogen-sulfide-selective membranes having the following characteristics:

| | |
|---|---|
| Hydrogen sulfide/methane selectivity: | 80 |
| Water vapor/methane selectivity: | 1,000 |
| Carbon dioxide/methane selectivity: | 12 |
| Methane flux: | $1 \times 10^{-6}$ cm$^3$(STP)/ cm$^2$.s.cmHg |

The compositions and flow rates of the permeate and residue streams were calculated and are given in Table 5.

TABLE 5

| STREAM | FEED | RESIDUE | PERMEATE |
|---|---|---|---|
| Flow rate (scfm) | 1,000 | 903 | 97 |
| CH$_4$ conc. (vol %) | 95.9 | 98.1 | 75.6 |
| CO$_2$ conc. (vol %) | 4.0 | 1.9 | 23.2 |
| H$_2$S conc. (ppm) | 100 | 4 | 995 |
| Water vapor conc. (vol %) | 0.1 | 2 ppm | 1.0 |

The membrane area used to perform such a separation was calculated to be about 70 m$^2$. The stage cut was just under 10% and the methane loss into the permeate was 7.5%. The process produces a residue stream that simultaneously meets pipeline specification for carbon dioxide, hydrogen sulfide and water vapor. The low grade permeate gas could be sent to the foul gas line.

Example 13

A calculation was performed as in Example 12 for a gas stream containing 100 ppm hydrogen sulfide, 1,200 ppm water vapor, 4 vol % carbon dioxide and the remainder methane, at a feed pressure of 1,000 psia. The scehematic of the process is again that of FIG. 2. The process was assumed to use one bank of more hydrogen-sulfide-selective membranes having the following characteristics:

| | |
|---|---|
| Hydrogen sulfide/methane selectivity: | 50 |
| Water vapor/methane selectivity: | 500 |
| Carbon dioxide/methane selectivity: | 15 |
| Methane flux: | $7.5 \times 10^{-6}$ cm$^3$(STP)/ cm$^2$.s.cmHg |

The compositions and flow rates of the permeate and residue streams were calculated and are given in Table 6.

TABLE 6

| STREAM | FEED | RESIDUE | PERMEATE |
|---|---|---|---|
| Flow rate (scfm) | 1,000 | 880 | 120 |
| CH$_4$ conc. (vol %) | 95.9 | 98.8 | 75.6 |
| CO$_2$ conc. (vol %) | 4.0 | 1.2 | 23.5 |
| H$_2$S conc. (ppm) | 100 | 4 | 767 |
| Wafer vapor conc. (ppm) | 1,200 | 1 | 1 vol % |

The membrane area used to perform such a separation was calculated to be about 120 m$^2$. The stage cut was 12% and the methane loss into the permeate was close to 10%. The process produces a residue stream that simultaneously meets pipeline specification for carbon dioxide, hydrogen sulfide and water vapor. The low grade permeate gas could be sent to the foul gas line.

Example 14

The simple design of Examples 12 and 13 is only possible for certain cases where the raw stream to be treated contains an appropriate balance of hydrogen sulfide and carbon dioxide. In many cases, a more complicated, optimized design is needed to improve the methane recovery and meet pipeline specifications without overprocessing.

Figure 5:
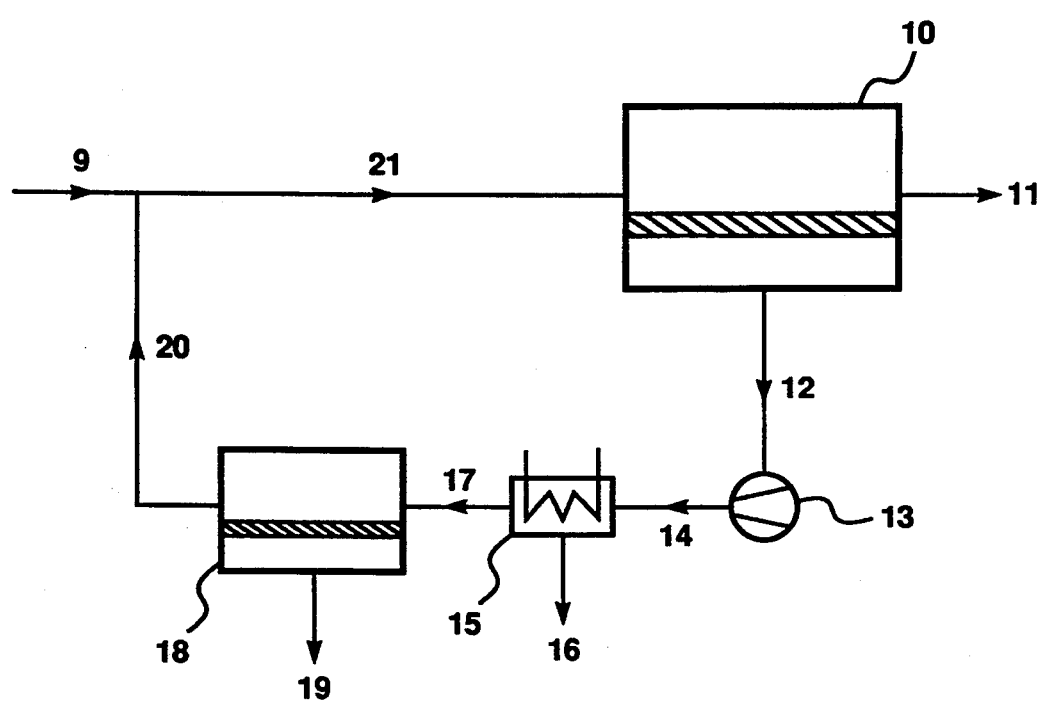
FIG. 5 is a basic schematic drawing of a typical two-stage membrane separation process.

A process was designed to handle a 1,000 scfm gas stream containing 1,000 ppm hydrogen sulfide, 0.1 vol % water vapor and the remainder methane, so as to keep methane loss in the permeate stream below 2%. The process uses a two-stage membrane separation system in which the permeate from the first bank of membrane modules becomes the feed for the second bank. A basic schematic of the process is shown in FIG. 5, where numeral 10 indicates the first stage bank of membrane modules and numeral 18 indicates the second stage bank of membrane modules. The incoming gas stream 9 is at 1,000 psia and is mixed with the residue stream 20 from the second stage to form the feed gas stream 21 to the first membrane stage. The permeate stream 12 from the first stage is recompressed to 1,000 psia in compressor 13. The compressed stream 14 passes to chiller 15, where water vapor is condensed and water is removed as liquid stream 16. The non-condensed stream 17 enters the second membrane stage 18, where further separation of hydrogen sulfide takes place. The residue stream from this stage is recirculated within the process. Both membrane stages were assumed to use more hydrogen-sulfide-selective membranes having the following characteristics:

Hydrogen sulfide/methane selectivity: 50
Water vapor/methane selectivity: 1,000
Methane flux: $7.5 \times 10^{-6}$ cm$^3$(STP)/cm$^2$.s.cmHg The compositions and flow rates of the first and second stage permeate and residue streams were calculated and are given in Table 7.

TABLE 7

| STREAM | FEED | RESIDUE | PERMEATE |
|---|---|---|---|
| FIRST STAGE | | | |
| Flow rate (scfm) | 1,200 | 985 | 215 |
| CH$_4$ conc. (vol %) | 99.82 | 99.99 | 98.99 |
| Water vapor conc. (vol %) | 0.08 | 0.0 | 0.45 |
| H$_2$S conc. (vol %) | 0.10 | 4 ppm | 0.55 |
| SECOND STAGE | | | |
| Flow rate (scfm) | 215 | 202 | 13 |
| CH4 conc. (vol %) | 99.42 | 99.89 | 92.12 |
| Water vapor conc. (ppm) | 330 | 21 | 5,015 |
| H$_2$S conc. (vol %) | 0.55 | 0.1 | 7.4 |

The membrane area used to perform such a separation was calculated to be about 280 m$^2$ total, 265 m$^2$ in the first stage and 15 m$^2$ in the second stage. The residue stream 11 from the first stage meets pipeline specifications. The permeate stream 19 from the second stage contains a high enough concentration of hydrogen sulfide to be passed to a Claus plant for sulfur recovery unit, or to a liquid redox process, such as LO-CAT, Sulferox, Hyperion or Stretford. The overall methane loss into the second stage permeate is very low, at just about 1%.

Example 15

A calculation was performed as in Example 14 for a gas stream containing 100 ppm hydrogen sulfide, 1,200 ppm water vapor, 4 vol % carbon dioxide and the remainder methane, at a feed pressure of 1,000 psia. The schematic of the process is again that of FIG. 5, except that in this case, no condenser 15 is used. Both membrane stages were assumed to use more hydrogen-sulfide-selective membranes having the following characteristics:

| | |
|---|---|
| Hydrogen sulfide/methane selectivity: | 50 |
| Water vapor/methane selectivity: | 500 |
| Carbon dioxide/methane selectivity: | 15 |
| Methane flux: | $7.5 \times 10^{-6}$ cm$^3$(STP)/cm$^2$.s.cmHg |

The compositions and flow rates of the product residue (first stage) and product permeate (second stage) streams were calculated and are given, together with the raw (unmixed) feed figures, in Table 8.

TABLE 8

| STREAM | FEED | RESIDUE | PERMEATE |
|---|---|---|---|
| Flow rate (scfm) | 1,000 | 970 | 30 |
| H$_2$S conc. (ppm) | 100 | 4 | 3,300 |
| CO$_2$ conc. (vol %) | 4.0 | 1.7 | 80.5 |
| Water vapor conc. (ppm) | 1,200 | 0.0 | 1.76 vol % |
| CH$_4$ conc. (vol %) | 95.9 | 98.3 | 17.4 |

The membrane area used to perform such a separation was calculated to be about 135 m$^2$ total, 127 m$^2$ in the first stage and 8 m$^2$ in the second stage. The residue stream 11 from the first stage meets pipeline specifications for all components. The overall methane loss into the second stage permeate is very low, at about 0.5%.

Example 16

Figure 8:
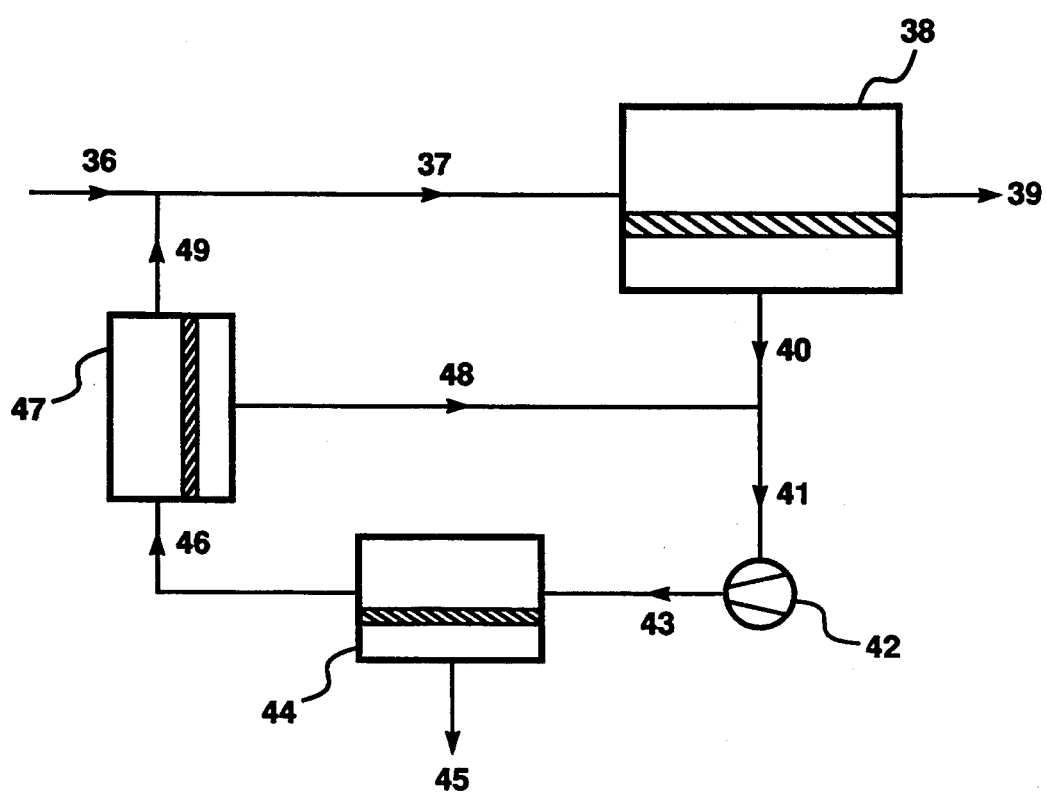
FIG. 8 is a basic schematic drawing of a two-stage membrane separation process with an auxiliary membrane unit forming a second-stage loop.

A process was designed to handle a 1,000 scfm gas stream containing 1,000 ppm hydrogen sulfide, the remainder methane. The process uses a membrane separation system as shown in FIG. 8. Numerals 38, 44 and 47 indicate the three banks of membrane modules: all contain the more hydrogen-sulfide-selective membrane. The incoming gas stream 36 is at 1,000 psia and is mixed with the residue stream 49 from the module(s) 47 to form the feed gas stream 37 to the first membrane stage. The permeate stream, 40, from the first stage is recompressed in compressor 42. Compressor 42 drives two membrane units, the second stage unit, 44, and an auxiliary module or set of modules, 47, that are connected on the permeate side either directly or indirectly to the inlet side of the compressor, so as to form a loop. Thus, permeate stream 48 may be merged with permeate stream 40 to form combined stream 41. The recompressed, combined stream, 43, passes as feed to membrane unit 44, and the residue stream, 46, from membrane unit 44 passes as feed to membrane unit 47. Permeate is withdrawn from the loop as stream 45 and the treated residue exits as stream 39. This system configuration is particularly useful in situations where the hydrogen sulfide content of the raw stream is relatively low, yet flaring is not an option and the stream has to be brought up to a viable concentration for sulfur recovery. A series of calculations was carried out by keeping the area of membrane unit 38 constant, but varying the relative areas of membrane units 44 and 47. The characteristics of the membrane were assumed to be as follows:

| | |
|---|---|
| Hydrogen sulfide/methane selectivity: | 50 |
| Carbon dioxide/methane selectivity: | 13 |
| Methane flux: | $7.5 \times 10^{-6}$ cm$^3$(STP)/cm$^2$.s.cmHg |

The results of the calculations are given in Table 9.

TABLE 9

| Membrane Area (m$^2$) | | | | Permeate conc. |
|---|---|---|---|---|
| Unit 38 | Unit 44 | Unit 47 | Total | (vol %) |
| 242 | 0 | 18 | 260 | 2.65 |
| 242 | 10 | 11 | 263 | 4.26 |
| 242 | 15 | 8 | 265 | 5.77 |
| 242 | 20 | 6 | 268 | 8.92 |
| 242 | 35 | 2 | 279 | 19.7 |
| 242 | 50 | 0.4 | 292.4 | 55.0 |

The residue stream 39 from the first stage meets pipeline specifications. A high concentration of hydrogen sulfide in the waste permeate stream can be achieved with an appropriate choice of membrane areas.

This type of design could also be used in situations where combinations of the two membrane types are indicated.

Example 17

Calculations similar to those in Example 16 were performed for a 1,000 scfm gas stream at 1,000 psia containing 100 ppm hydrogen sulfide, 1,200 ppm water vapor, 4 vol % carbon dioxide, the remainder methane. The process again was considered to use a membrane separation system as shown in FIG. 8. The characteristics of the membrane were assumed to be as follows:

| | |
|---|---|
| Hydrogen sulfide/methane selectivity: | 50 |
| Carbon dioxide/methane selectivity: | 15 |
| Water vapor/methane selectivity: | 500 |
| Methane flux: | $7.5 \times 10^{-6}$ cm$^3$(STP)/cm$^2 \cdot$ s $\cdot$ cmHg |

The compositions and flow rates of the product residue (first stage) and product permeate (second stage) streams were calculated and are given, together with the raw (unmixed) feed figures, in Table 10.

TABLE 10

| STREAM | FEED | RESIDUE | PERMEATE |
|---|---|---|---|
| Flow rate (scfm) | 1,000 | 980 | 20 |
| H$_2$S conc. (ppm) | 100 | 4 | 4,150 |
| CO$_2$ conc. (vol %) | 4.0 | 2.0 | 85.5 |
| Water vapor conc. (ppm) | 1,200 | 0.0 | 5.2 vol % |
| CH$_4$ conc. (vol %) | 95.9 | 98.0 | 8.9 |

The membrane area used to perform such a separation was calculated to be about 137 m$^2$ total, 127 m$^2$ in the first stage, 4 m$^2$ in the second stage and 6 m$^2$ in the auxiliary stage. The residue stream 11 from the first stage meets pipeline specifications for all components.

The overall methane loss into the second stage permeate is very low, at about 0.2%.

Example 18

The calculations of Example 17 were repeated for a feed stream containing a higher hydrogen sulfide content, 1,000 ppm but a lower carbon dioxide content, 2 vol %, plus 1,200 ppm water vapor. The results are given in Table 11.

TABLE 11

| STREAM | FEED | RESIDUE | PERMEATE |
|---|---|---|---|
| Flow rate (scfm) | 1,000 | 980 | 20 |
| $H_2S$ conc. (ppm) | 1,000 | 4 | 5.3 vol % |
| $CO_2$ conc. (vol %) | 2.0 | 0.6 | 75.1 |
| Water vapor conc. (ppm) | 1,200 | 0.0 | 6.4 vol % |
| $CH_4$ conc. (vol %) | 97.8 | 99.4 | 13.2 |

The membrane area used to perform such a separation was calculated to be about 257 m² total, 240 m² in the first stage, 4 m² in the second stage and 13 m² in the auxiliary stage. The residue stream 11 from the first stage meets pipeline specifications for all components. The overall methane loss into the second stage permeate is very low, at about 0.25% and the hydrogen sulfide concentration in the product permeate stream has been built up to over 5 vol %.

Example 19

A calculation was performed as in Example 13 for a gas stream containing 100 ppm hydrogen sulfide, 1,200 ppm water vapor, 4 vol % carbon dioxide and the remainder methane, at a feed pressure of 1,000 psia. The schematic of the process was again that of FIG. 2, except that in this case a vacuum pump was assumed to be used on the permeate side of the membrane to lower the permeate pressure to 5 psia. The process was assumed to use one bank of more hydrogen-sulfide-selective membranes having the following characteristics:

| | |
|---|---|
| Hydrogen sulfide/methane selectivity: | 50 |
| Water vapor/methane selectivity: | 500 |
| Carbon dioxide/methane selectivity: | 15 |
| Methane flux: | $7.5 \times 10^{-6}$ cm³(STP)/ cm² · s · cmHg |

The compositions and flow rates of the permeate and residue streams were calculated and are given in Table 12.

TABLE 12

| STREAM | FEED | RESIDUE | PERMEATE |
|---|---|---|---|
| Flow rate (scfm) | 1,000 | 900 | 100 |
| $CH_4$ conc. (vol %) | 95.9 | 98.6 | 71.9 |
| $CO_2$ conc. (vol %) | 4.0 | 1.5 | 26.8 |
| $H_2S$ conc. (ppm) | 100 | 4 | 959 |
| Water vapor conc. (ppm) | 1,200 | 0 | 1.2 vol % |

The membrane area used to perform such a separation was calculated to be about 91 m². The stage cut was 10% and the methane loss into the permeate was about 7.5%.

Example 20

Figure 7:
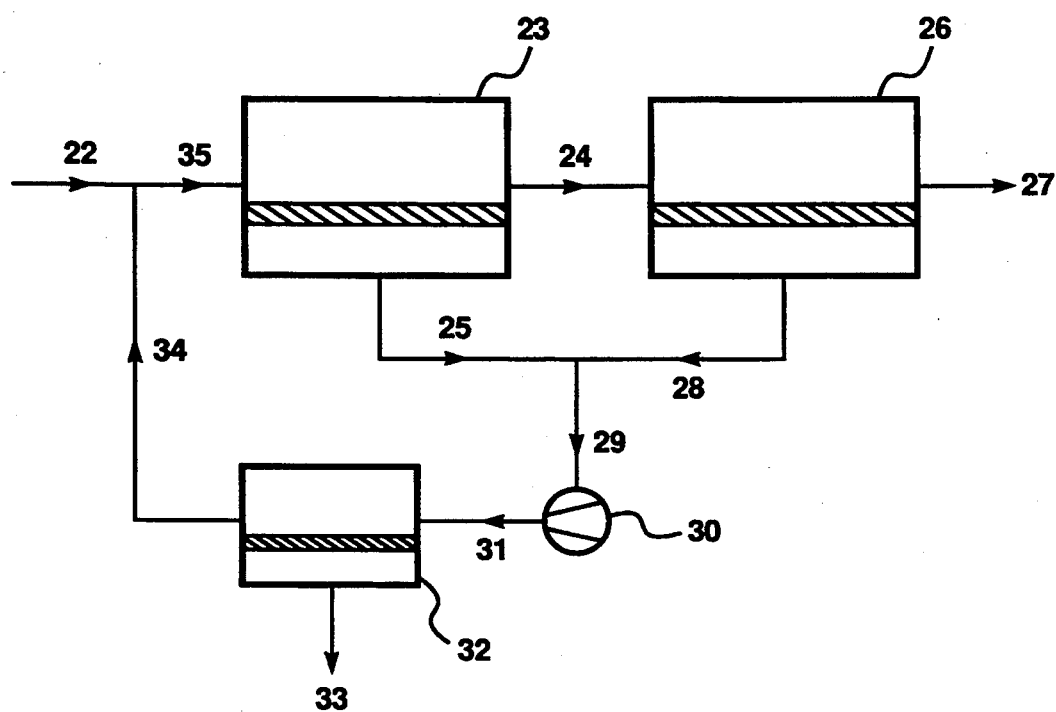
FIG. 7 is a basic schematic drawing of a two-step/-two-stage membrane separation process.

Example 20 deals with streams in which the feed composition is in zone D, so that a combination of membrane types is indicated. A process was designed to handle a 1,000 scfm gas stream containing 1,000 ppm hydrogen sulfide, 15 vol % carbon dioxide, 1,200 ppm water vapor and the remainder methane, a composition that falls in Zone D of FIG. 1, but close to the boundary of Zone B. The process uses a membrane separation system as shown in FIG. 7. Numerals 23, 26 and 32 indicate the three banks of membrane modules; 23 and 32 contain the more hydrogen-sulfide-selective membrane; 26 contains the more carbon-dioxide-selective membrane. The incoming gas stream 22 is at 1,000 psia and is mixed with the residue stream 34 from the second stage to form the feed gas stream 35 to the first membrane stage. The residue stream, 24, from the first bank of modules passes as feed to the second bank of the first stage, 26. In this case, the permeate streams 25 and 28 from the two steps of the first stage are combined as stream 29 to be recompressed in compressor 30, then passed as compressed stream 31 to the second membrane stage 32. It will be apparent to those of ordinary skill in the art that two separate compressors could be used and the stream combined after compression. Also, in cases where the stream to be treated contains water vapor, the system could include a condenser as in FIG. 5 to condense permeating water vapor. The characteristics of the membrane types were assumed to be as follows:

| | |
|---|---|
| More hydrogen-sulfide-selective membrane: | |
| Hydrogen sulfide/methane selectivity: | 50 |
| Carbon dioxide/methane selectivity: | 13 |
| Water vapor/methane selectivity: | 200 |
| Methane flux: | $7.5 \times 10^{-6}$ cm³(STP)/ cm² · s · cmHg |
| More carbon-dioxide-selective membrane: | |
| Hydrogen sulfide/methane selectivity: | 25 |
| Carbon dioxide/methane selectivity: | 20 |
| Water vapor/methane selectivity: | 200 |
| Methane flux: | $7.5 \times 10^{-6}$ cm³(STP)/ cm² · s · cmHg |

The compositions of the various streams were calculated and are given in Table 13.

TABLE 13

| Stream # | $CH_4$ conc. (vol %) | $H_2S$ conc. (ppm) | $H_2O$ conc. (ppm) | $CO_2$ conc. (vol %) |
|---|---|---|---|---|
| 22 | 84.9 | 1,000 | 1,200 | 15.0 |
| 35 | 63.9 | 1,000 | 760 | 36.0 |
| 24 | 79.4 | 70 | 0.0 | 20.6 |
| 27 | 98.0 | 4 | 0.0 | 2.0 |
| 25 | 16.6 | 3,740 | 3,000 | 82.7 |
| 28 | 37.0 | 221 | 1.0 | 63.0 |
| 31 | 26.2 | 2,073 | 1,580 | 73.4 |
| 33 | 3.0 | 7,280 | 8,800 | 95.4 |
| 34 | 31.1 | 999 | 90 | 68.8 |

The membrane areas required were as follows: 119 m² for membrane 23, 188 m² for membrane 26 and 17 m² for membrane 32. The residue stream 27 from the first stage meets pipeline specifications. The permeate stream 33 from the second stage contains about 0.7 vol % hydrogen sulfide and the overall methane loss is about 0.4%.

Example 21

Figure 6:
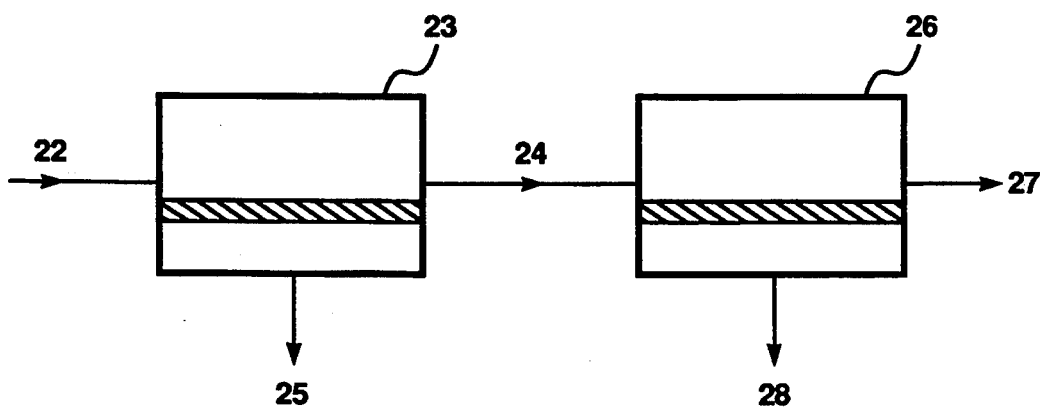
FIG. 6 is a basic schematic drawing of a two-step membrane separation process.

Example 21 also deals with streams in which the feed composition is in zone D, so that a combination of membrane types is indicated, but in this case a simple, one-stage, two step, membrane process is used. The gas stream was assumed to contain 100 ppm hydrogen sulfide, 10 vol % carbon dioxide, 1,200 ppm water vapor and the remainder methane, at a feed pressure of 1,000 psia. The process uses a combination process design as in FIG. 6, where numeral 23 indicates a more hydrogen-sulfide-selective bank of membrane modules and numeral 26 indicates a more carbon-dioxide-selective bank of membrane modules. The incoming gas stream 22 is at 1,000 psia. The residue stream 24 from the first bank of modules forms the feed to the second bank.

The more hydrogen-sulfide-selective membrane was assumed to have the following characteristics:

| | |
|---|---|
| Hydrogen sulfide/methane selectivity: | 50 |
| Water vapor/methane selectivity: | 200 |
| Carbon dioxide/methane selectivity: | 13 |
| Methane flux: | $7.5 \times 10^{-6}$ cm$^3$(STP)/ cm$^2 \cdot$ s $\cdot$ cmHg |

The more carbon-dioxide-selective membrane was assumed to have the following characteristics:

| | |
|---|---|
| Carbon dioxide/methane selectivity: | 20 |
| Hydrogen sulfide/methane selectivity: | 25 |
| Water vapor/methane selectivity: | 200 |
| Methane flux: | $7.5 \times 10^{-6}$ cm$^3$(STP)/ cm$^2 \cdot$ s $\cdot$ cmHg |

The compositions and flow rates of the permeate and residue streams from each bank of modules were calculated and are given in Table 14.

TABLE 14

| STREAM | FEED | RESIDUE | PERMEATE |
|---|---|---|---|
| FIRST MODULE BANK (more hydrogen-sulfide-selective membrane) | | | |
| Flow rate (scfm) | 1,000 | 900 | 101 |
| CH$_4$ conc. (vol %) | 89.9 | 94.38 | 50.35 |
| CO$_2$ conc. (vol %) | 10.0 | 5.62 | 49.0 |
| H$_2$O conc. (ppm) | 1,200 | 4 | 1.18 vol % |
| H$_2$S conc. (ppm) | 100 | 14 | 866 |
| SECOND MODULE BANK (more carbon-dioxide-selective membrane) | | | |
| Flow rate (scfm) | 900 | 811 | 88.7 |
| CH$_4$ conc. (vol %) | 94.38 | 97.98 | 61.47 |
| CO$_2$ conc. (vol %) | 5.62 | 2.01 | 38.53 |
| H$_2$O conc. (ppm) | 4 | 0 | 40 |
| H$_2$S conc. (ppm) | 14 | 4 | 105 |

The total membrane area used is about 135 m$^2$. Residue stream 27 from the second stage meets pipeline specification. If the permeate streams 25 and 28 from the two banks of membrane modules are pooled, the permeate composition is 507 ppm hydrogen sulfide, 44 vol % carbon dioxide, 0.62 vol % water vapor and 55.5 vol % methane. The methane loss in the pooled permeates is about 12%. This loss could be reduced if the process were optimized.

We claim:

1. A membrane process for treating a gas stream comprising hydrogen sulfide and methane, and having a relative humidity of at least 70%, said process comprising:

(a) passing said gas stream across the feed side of a membrane having a feed side and a permeate side;

(b) withdrawing from said feed side a residue stream having a relative humidity no greater than about 10%;

(c) withdrawing from said permeate side a permeate stream enriched in hydrogen sulfide and water vapor compared with said gas stream;

said process being characterized in that said membrane, when in use in said process, exhibits a selectivity for hydrogen sulfide over methane of at least 35, measured with a mixed gas stream containing at least hydrogen sulfide, methane and water vapor and at a feed pressure of at least 500 psig.

2. The process of claim 1, wherein said relative humidity of said gas stream is at least 90%.

3. The process of claim 1, wherein said selectivity is at least 40.

4. The process of claim 1, wherein said selectivity is at least 50.

5. The process of claim 1, wherein said feed pressure at which said selectivity is measured is at least 1,000 psig.

6. The process of claim 1, wherein said gas stream also contains carbon dioxide.

7. The process of claim 1, wherein said residue stream contains water vapor in a concentration no greater than about 500 ppm.

8. The process of claim 1, wherein said residue stream contains water vapor in a concentration no greater than about 140 ppm.

9. The process of claim 1, wherein said residue stream contains water vapor in a concentration no greater than about 80 ppm.

10. The process of claim 1, wherein said residue stream contains water vapor in a concentration no greater than about 20 ppm.

11. The process of claim 1, wherein said residue stream contains hydrogen sulfide in a concentration no greater than about 20 ppm.

12. The process of claim 1, wherein said residue stream contains hydrogen sulfide in a concentration no greater than about 4 ppm.

13. The process of claim 1, wherein said membrane comprises a composite membrane having a selective layer comprising a polymer that is rubbery under the operating conditions of the process.

14. The process of claim 1, wherein said membrane comprises a composite membrane having a selective layer that has a water sorption greater than 5% upon immersion in liquid water.

15. The process of claim 1, wherein said membrane comprises a composite membrane having a selective layer that has a water sorption greater than 10% upon immersion in liquid water.

16. The process of claim 1, wherein said membrane comprises a block copolymer containing a polyether block.

17. The process of claim 1, wherein said membrane comprises a polyamide-polyether block copolymer having the general formula

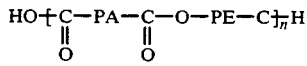

wherein PA is a polyamide group, PE is a polyether group and n is a positive integer.

18. The process of claim 1, wherein said permeate stream has a methane content such that methane loss from said gas stream is no more than about 5%.

19. The process of claim 18, wherein said methane loss is no more than about 2%.

20. The process of claim 1, wherein said residue stream meets pipeline specifications for hydrogen sulfide and water vapor.

21. The process of claim 1, wherein said gas stream contains carbon dioxide, hydrogen sulfide and water vapor, all in concentrations above pipeline specification, and wherein said residue stream meets pipeline specifications for carbon dioxide, hydrogen sulfide and water vapor.

22. The process of claim 1, further comprising:
(d) submitting said residue stream to an additional membrane separation step.

23. The process of claim 22, wherein said additional membrane separation step uses a membrane characterized as in claim 1.

24. The process of claim 22, wherein said additional membrane separation step uses a membrane having a selectivity for hydrogen sulfide over methane of less than 35.

25. The process of claim 1, further comprising:
(d) submitting said permeate stream to an additional membrane separation step.

26. The process of claim 25, wherein said additional membrane separation step uses a membrane characterized as in claim 1.

27. The process of claim 25, wherein said additional membrane separation step uses a membrane having a selectivity for hydrogen sulfide over methane of less than 35.

28. The process of claim 1, wherein said residue stream is submitted to a non-membrane treatment step.

29. The process of claim 1, wherein said permeate stream is submitted to a non-membrane treatment step.

30. The process of claim 1, wherein said gas stream comprises natural gas.

* * * * *